United States Patent [19]

Jandura et al.

[11] Patent Number: 5,460,209
[45] Date of Patent: Oct. 24, 1995

[54] AUTOMATIC DISPENSER FOR DRY INGREDIENTS

[75] Inventors: Louise Jandura, Belmont; Amy B. Smith, Lexington, both of Mass.; Susan D. Ward, Vancouver, Wash.

[73] Assignee: Massachusetts Institute of Technology, Cambridge, Mass.

[21] Appl. No.: 164,098

[22] Filed: Dec. 8, 1993

[51] Int. Cl.$^6$ ........................................ G01G 13/02
[52] U.S. Cl. .................. 141/83; 141/104; 366/141; 366/108; 366/336; 222/132; 222/135; 222/199; 177/70; 177/116
[58] Field of Search ............... 141/9, 71, 83, 141/100, 104; 366/108, 141, 336, 337; 222/132, 135, 196, 199, 200, 564; 177/70, 116

[56] References Cited

U.S. PATENT DOCUMENTS

| | | | |
|---|---|---|---|
| 1,408,539 | 3/1922 | Simon | 141/104 |
| 1,421,896 | 7/1922 | Benedict | 222/200 |
| 1,615,438 | 1/1927 | Bott | 141/104 X |
| 2,665,797 | 1/1954 | Leypoldt | 198/220 |
| 3,215,314 | 11/1965 | Haley | 222/200 X |
| 3,261,379 | 7/1966 | Stockel et al. | 141/83 |
| 3,362,490 | 1/1968 | Maxwell | 177/70 |
| 3,595,328 | 7/1971 | Griem | 177/1 |
| 3,827,467 | 8/1974 | Henley et al. | 141/104 |
| 4,114,706 | 9/1978 | Realini | 177/70 |
| 4,202,466 | 5/1980 | Cook | 222/1 |
| 4,272,824 | 6/1981 | Lewinger | 364/502 |
| 4,470,525 | 9/1984 | Daw et al. | 222/200 |
| 4,813,503 | 3/1989 | Douglas | 177/25.18 |
| 4,867,258 | 9/1989 | Narukawa | 177/116 |
| 5,024,352 | 6/1991 | Gmür | 222/1 |
| 5,035,294 | 7/1991 | Volk | 177/70 |
| 5,080,184 | 1/1992 | Yamakita | 177/1 |
| 5,083,591 | 1/1992 | Edwards et al. | 141/9 |
| 5,148,841 | 9/1992 | Graffin | 141/83 |
| 5,156,194 | 10/1992 | von Nehring et al. | 141/83 X |
| 5,244,020 | 9/1993 | Bruno et al. | 141/83 |
| 5,341,961 | 8/1994 | Hausam | 222/237 |
| 5,363,746 | 11/1994 | Gordon | 99/328 |

FOREIGN PATENT DOCUMENTS

| | | | |
|---|---|---|---|
| 0667473 | 6/1979 | U.S.S.R. | 222/199 |
| 1654148 | 6/1991 | U.S.S.R. | 222/200 |

OTHER PUBLICATIONS

Brochure from Quick Measure dispensing apparatus, sold by Homestar. Date unknown. Possibly 1989.

*Primary Examiner*—J. Casimer Jacyna
*Attorney, Agent, or Firm*—Steven J. Weissburg

[57] ABSTRACT

An apparatus for dispensing dry ingredient has a plurality of containers, each for a different ingredient. Each has a body having an internal chamber, and a port for dispensing the ingredient, which is arranged gravitationally below the chamber when in use. Each container has at least two baffles adjacent the port. The baffles are inclined and define a passageway through which the ingredient may pass. The passageway is sized and the baffles are inclined such that the ingredient rests upon the baffles. The apparatus also includes a collection stage that is arranged relative to each of the plurality of container ports so that ingredient dispensed from each port is deposited upon the collection stage. The apparatus also includes a vibrator for exciting at least one of the baffles of each container such that the ingredient is urged to pass through the respective passageway and out of the chamber.

The apparatus typically further includes a controller for activating and deactivating the vibrators. A weighing apparatus may be provided coupled to the collection stage. Rather than a weighing stage, the apparatus may include a calculator for calculating the amount of ingredient that has been deposited upon the collection stage based on a constant volume flow rate for the ingredient.

30 Claims, 16 Drawing Sheets

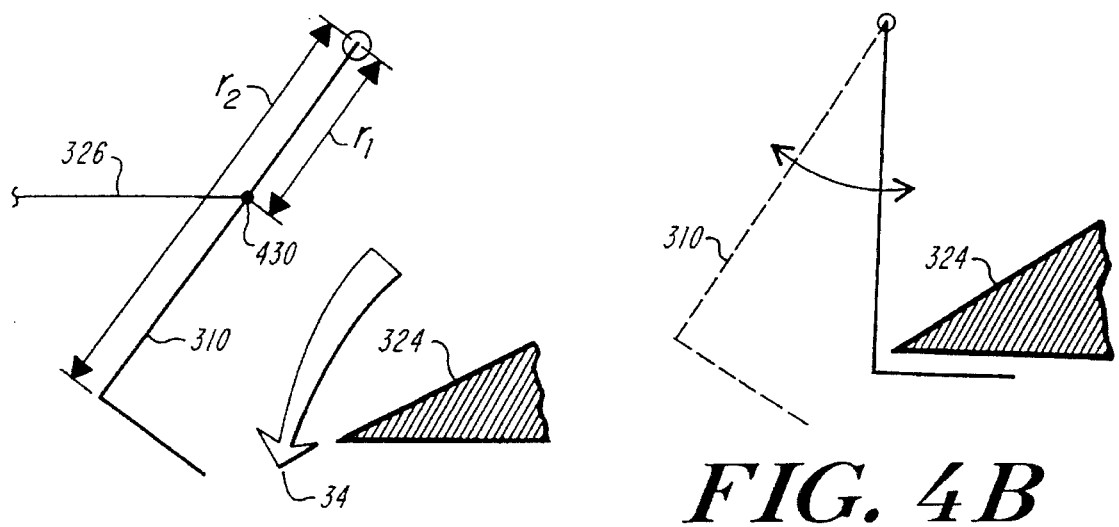
FIG. 4A  FIG. 4B
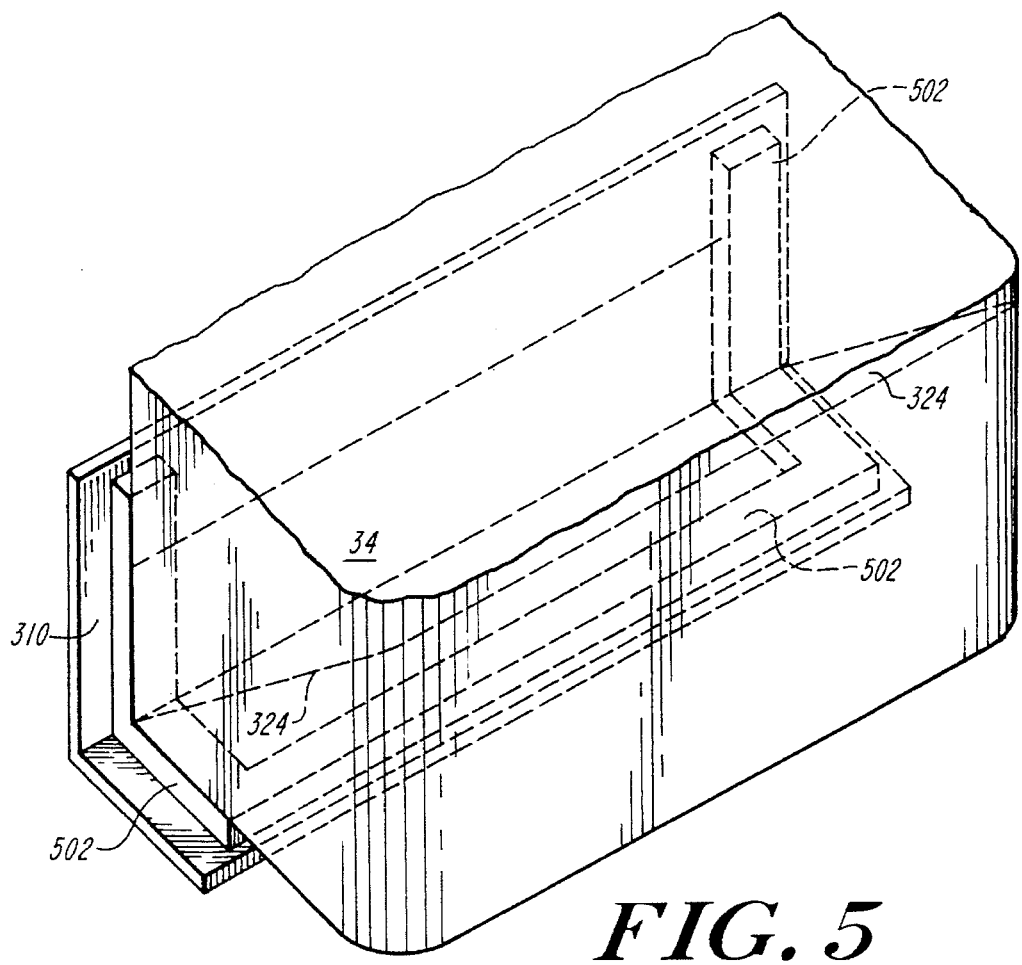
FIG. 5

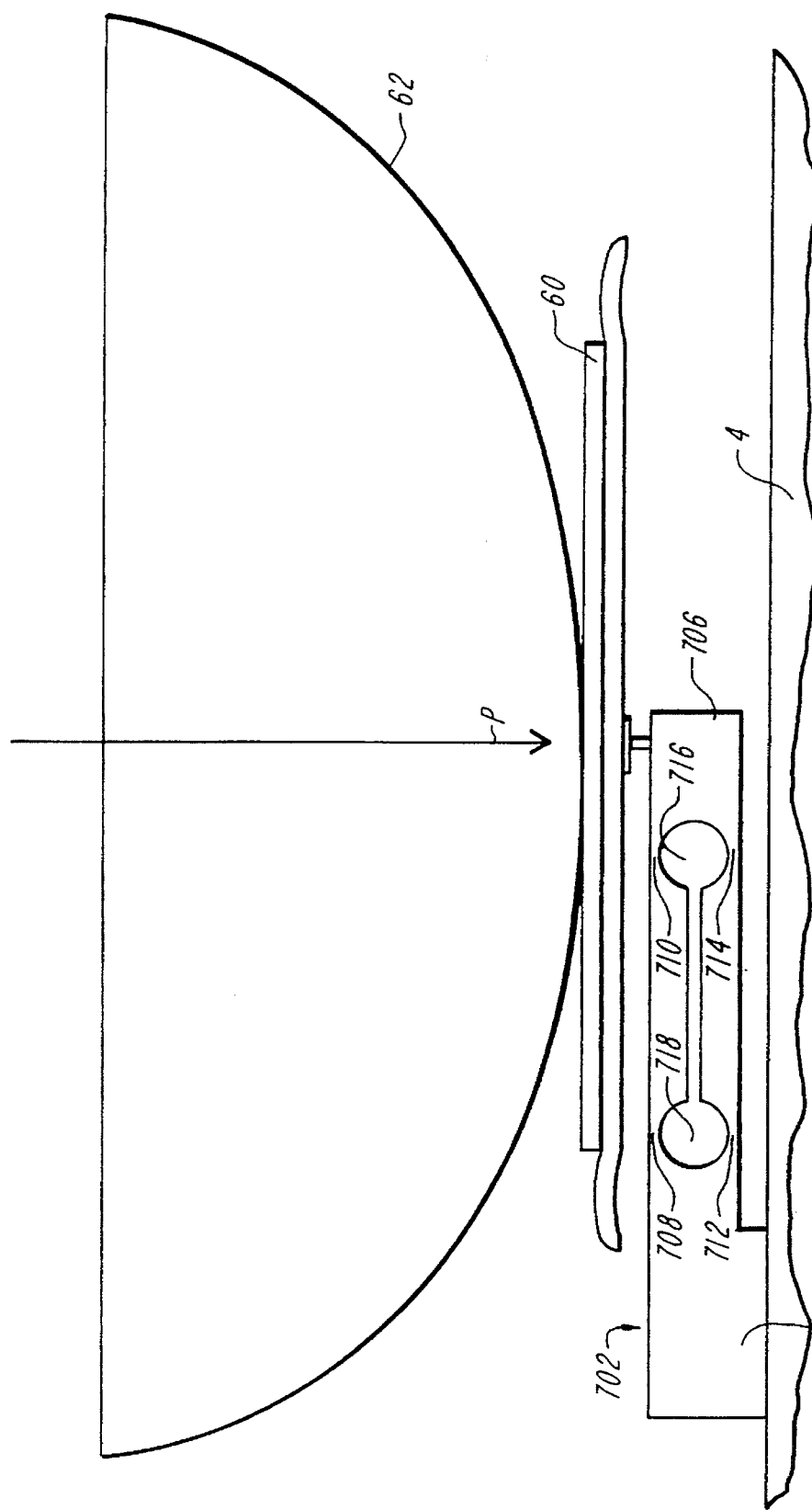

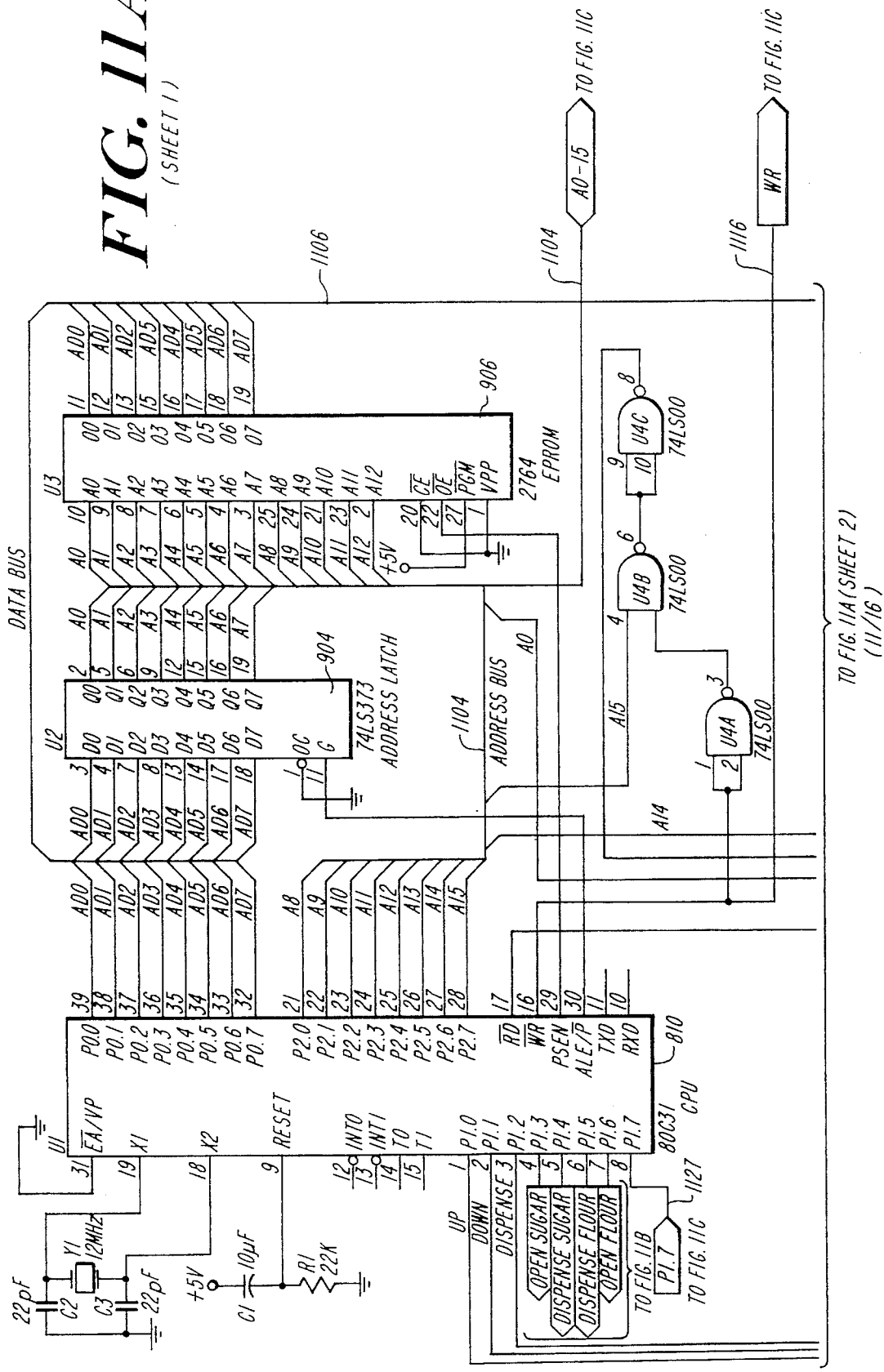
FIG. 11A (SHEET 1)

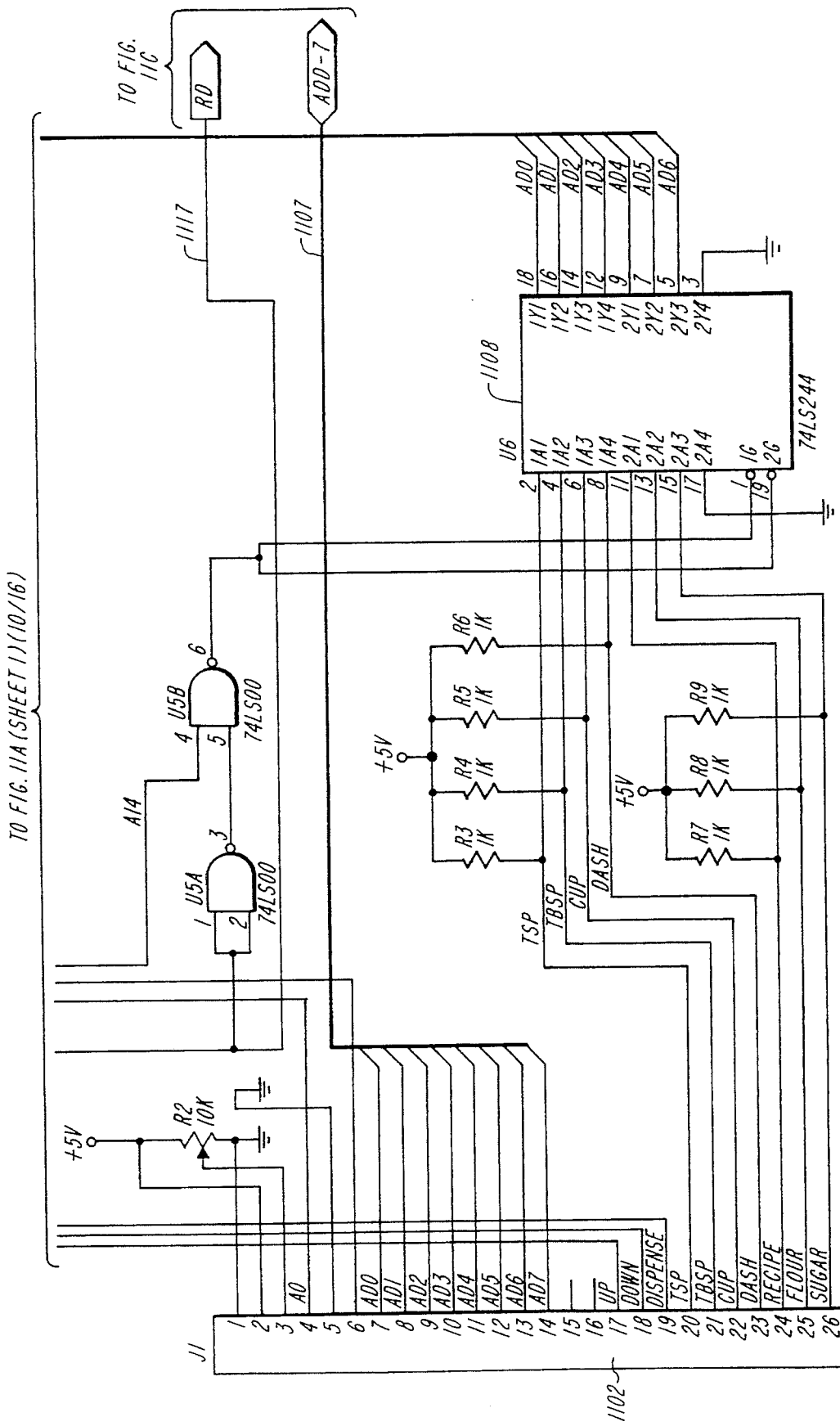
FIG. 11A (SHEET 2)

AUTOMATIC DISPENSER FOR DRY INGREDIENTS

BACKGROUND

The present invention relates generally to the field of dispensing dry ingredients, typically ingredients used for baking.

In order to prepare baked goods, such as breads, cakes, pie crusts, cookies, etc., it is necessary to mix together different amounts of different dry ingredients. Dry ingredients include those commonly understood as such, such as flour, meal, flakes, salt, sugar, powders, nuts, chocolate chip morsels, coffee beans (whole or ground), etc. For instance, it may be necessary to mix five cups of flour, with one-half of a cup of sugar, one tablespoon of salt, one cup of chocolate chip morsels and a teaspoon of baking soda. (Dry ingredients in metric measured recipes are typically measured in weights, e.g. grams. The volume measurement for metric recipes is milliliters.)

In the ordinary situation, each of the different dry ingredients are kept in their own, separate container. The baker must collect each of the containers, measure out the desired amount of the selected ingredients using different measuring containers, (or cleaning a single measuring container between measurements) and deposit the measured volume into a common mixing bowl. The ingredients are subsequently mixed by hand or by power.

During the course of conventional mixing operations, as described above, the baker may spill some of the contents of one or the other of the containers as the desired amount is transferred into the measuring container and then into the mixing container. It is also common to drop the storage container, thereby spilling its contents. Other common difficulties in conventional mixing relate to measuring mistakes, such as confusing a tablespoon for a teaspoon, a volumetric ounce for a weight referenced ounce, forgetting an ingredient or including the desired volume of an ingredient twice. It is also common to mistakenly use baking soda for baking powder, and to confuse other pairs of dry ingredients.

Another difficulty in connection with the use of dry ingredients is that they must be kept in moisture proof containers which are also impervious to invasion by bugs, rodents and other pests. Thus, the containers must be securely fastened shut. Further, some of the containers must be rather large, for the maintenance of ingredients like flour and sugar for which large volumes are customarily used. This large volume, coupled with the need for secure closure often results in spilling problems, difficulties in removing and replacing the container from its storage location etc. Further, it often happens that a container will contain less than the required amount of the dry ingredient, which shortage will have been missed by the baker, thus necessitating an interruption or perhaps cancellation of the baking preparations.

These difficulties arise principally in home or personal baking situations, where the baker may have a minimal experience with baking. However, they also arise in professional baking situations, as well as in experienced non-professional situations, due to haste, interruption, overwork, etc.

Thus, there is need for an apparatus to ease the burdens of measuring, dispensing and mixing dry ingredients. Thus, it is an object of the invention to avoid the potential for spillage and clean-up during the process of measuring out/dispensing dry ingredients. Another object of the invention is to facilitate precise and neat measuring of dry ingredients, minimizing the risk of measurement errors. It is also an object to enable a user to specify a general recipe for a selected baked good, for instance a chocolate chip cookie mix, and to have an apparatus automatically measure and assemble the dry ingredients together. Another object is to enable the user to specify individual ingredients, either by weight, or volume, or a combination of both, and to have the ingredients measured out without need for using a measuring volume device, such as a cup or a spoon. Yet another object of the invention is to provide an automatic measuring device having a resolution on the order of one teaspoon per cup (about 2%) and on the order of 7% for smaller measures, such as a teaspoon. Another object of the invention is to monitor the use of ingredient so that a warning can be issued when the remaining amount of ingredient becomes lower than desired.

SUMMARY

A preferred embodiment of the invention is an apparatus for dispensing dry ingredient. The apparatus comprises a plurality of containers, each container for containing a different ingredient. Each of the containers comprises a body having an internal chamber, a port for dispensing the ingredient, which port is arranged gravitationally below the chamber when in use. Each cannister has at least two baffles adjacent the port. The baffles are inclined relative to a gravitational field when in use and define a passageway through which the ingredient may pass. The passageway is sized and the baffles are inclined such that the ingredient is held within the chamber body. The apparatus also includes a collection stage that is arranged relative to each of the plurality of container ports so that ingredient dispensed from each port is deposited upon the collection stage. Finally, in the basic embodiment, the apparatus includes a vibrator for exciting at least one of the baffles of each container such that the ingredient is urged to pass through the respective passageway and out of the chamber.

Another embodiment of the apparatus further includes a controller for activating the vibrator associated with the cannister containing a preselected type of ingredient and for deactivating the associated vibrator if a preselected amount of preselected type of ingredient has been deposited upon the collection stage.

According to another embodiment, the apparatus also includes a weighing apparatus coupled to the collection stage, such that the weighing stage may generate a signal that corresponds to the weight of ingredient deposited upon the collection stage.

Rather than a weighing stage, the apparatus may include a calculator for calculating the amount of ingredient that has been deposited upon the collection stage during the time interval between when the associated vibrator is activated and when it is deactivated, based on a constant volume flow rate for the ingredient.

Another embodiment of the invention includes a user interface with input controls for specifying the type of ingredient, the amount, whether the amount is specified in weight or volume measures, and combinations of ingredients in recipes. The apparatus may include a memory, such as an EPROM, which stores different recipes. The EPROM may also store ingredient densities, for use by the apparatus in converting amounts specified by the user in volume to a weight measure.

According to other embodiments, the apparatus contains between two and eight cannisters, which may be selectably interchangeable. The cannisters may be uniform in size, or, more typically, different in size depending on the normal volume of use of particular ingredients.

BRIEF DESCRIPTION OF THE DRAWINGS

These and other features, aspects, and advantages of the present invention will become better understood with regard to the following description, appended claims and accompanying drawings, where:

FIG. 4A is a schematic representation of a shutter of the invention for selectively maintaining ingredient in a cannister and allowing it to be dispensed from the cannister, shown in the open position;

FIG. 4B is a schematic perspective representation of the shutter shown in FIG. 4A, moving toward the closed position;

FIG. 5 is a schematic representation of another embodiment of a shutter of the invention, using a flexible seal adjacent the shutter;

FIG. 6 shows schematically the weighing hardware of an embodiment of the invention;

FIG. 11A shows schematically a portion of a main circuit for use with the invention, for communicating electric control signals among a microprocessor, user interface, weight sensors and shutter actuators, showing principally the microprocessor;

DETAILED DESCRIPTION

Figure 1:
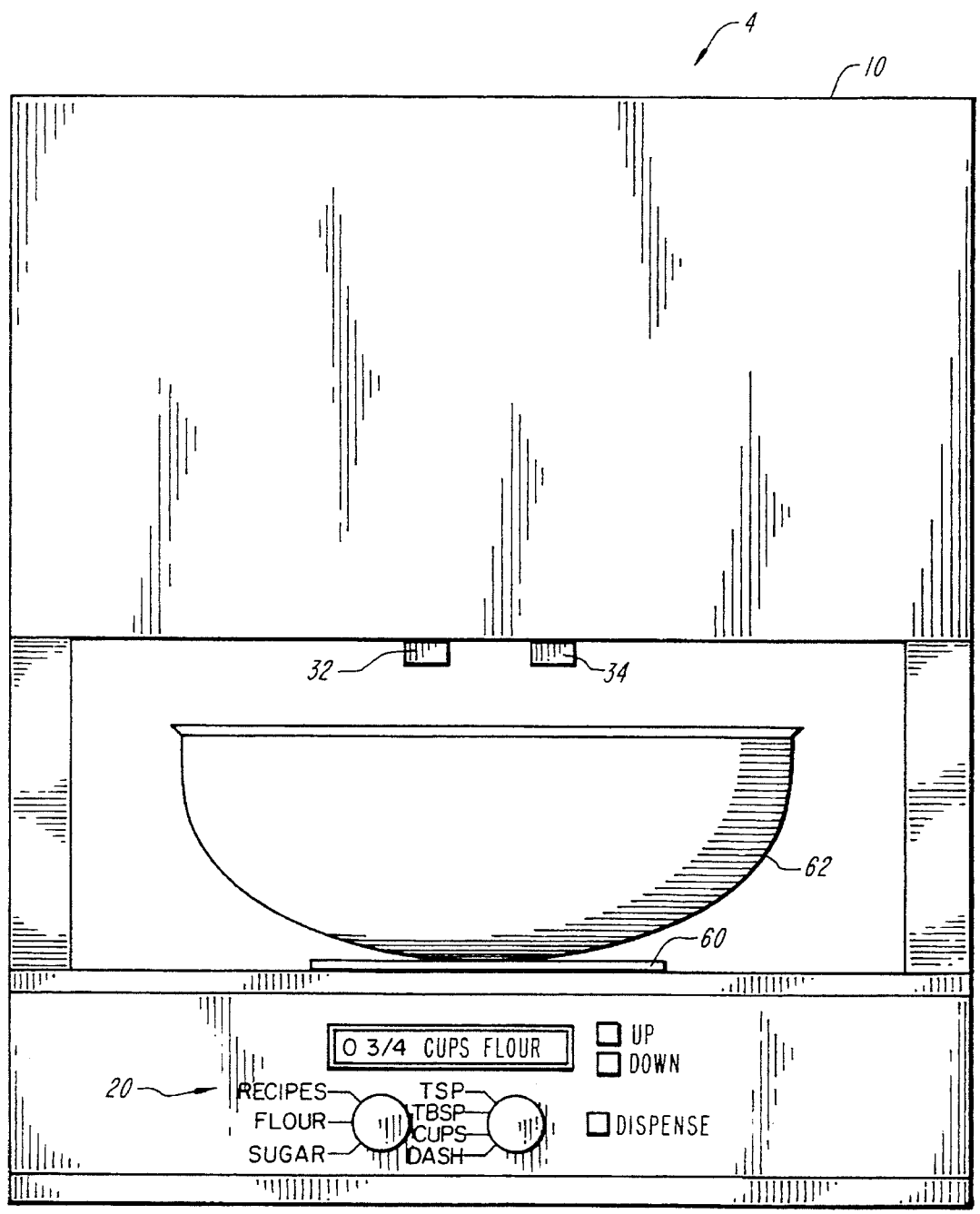
FIG. 1 is a schematic representation of an embodiment of the invention, showing a particular user interface, and provided with two ingredient dispensing spouts.

An embodiment of the invention is shown schematically with reference to FIG. 1. A mixing bowl 62 rests upon collection platform 60. The mixing bowl is situated below a cannister storage compartment 10, which, in the embodiment shown, houses two cannisters (not shown). The cannisters are each equipped with a dispensing spout 32 and 34 respectively, which are arranged relative to the mixing bowl 62 such that dry ingredient falling from the dispensing spout falls into the mixing bowl 62. A user interface control panel 20 enables the user to specify the type and amount of ingredients desired to be measured into the mixing bowl 62. All of the foregoing modules, i.e., the housing 10, the mixing bowl 62, collection platform 60 and the user interface 20 are associated together in an integrated unit 4.

Figure 2:
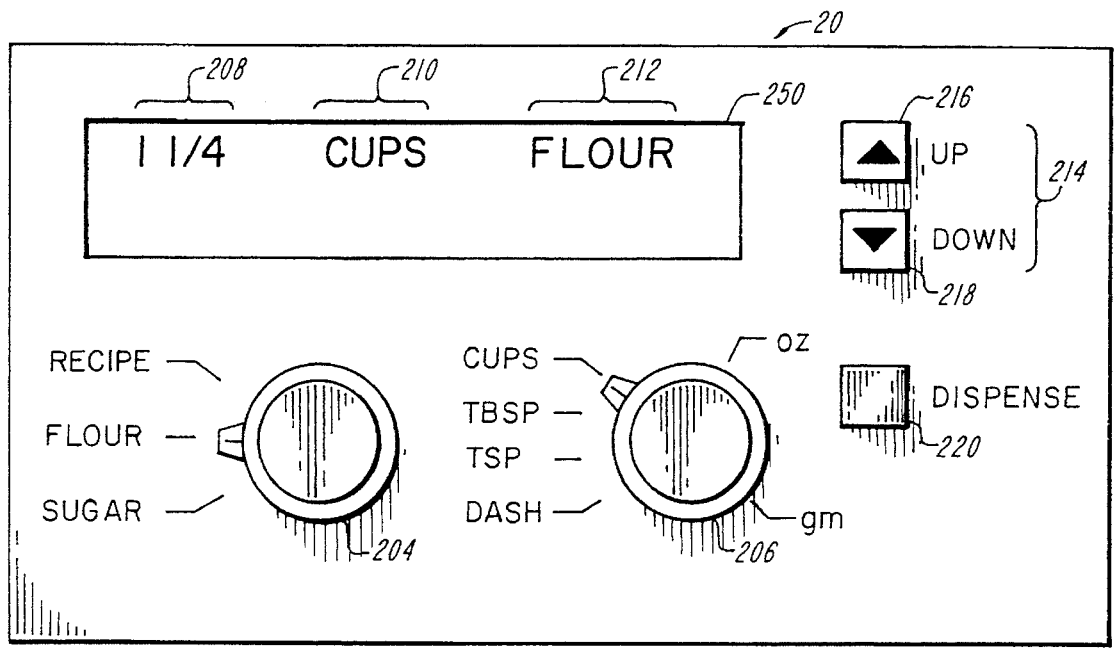
FIG. 2 is a schematic representation of a preferred embodiment of a user interface for the invention.

A preferred embodiment of the user interface 20 of the invention is shown in more detail with reference to FIG. 2. An output display 250 may be liquid crystal or led display, or any other suitable apparatus for the display of alpha numeric information. The display 250 includes three zones. The amount zone 208 is for the display of the amount of the ingredient that is being measured and dispensed. The amount zone displays the quantity of ingredient that the user has selected, using the increment/decrement controls 214, discussed below. The units zone 210 displays the units in which the amount is to be measured, as selected by the user by positioning of unit selection control 206. The ingredient zone 212 displays the type of ingredient to be measured as selected by the user with ingredient selection control 204.

To specify the amount of ingredient to be measured and dispensed by the apparatus, the user selects the type of ingredient with ingredient selection control 204, such as selecting flour or sugar. A typical embodiment of the invention will also have available numerous other dry ingredients for selection, such as whole wheat flour, rye flour, baking soda, salt, chocolate chips, nuts, etc. According to a preferred embodiment of the invention, it is also possible to specify a recipe that incorporates amounts of more than one ingredient, for instance, two cups of flour and one-half cup of sugar. The user similarly specifies the units of measure by making a selection with unit selection control 206. In the embodiment shown, the user specifies the amount of the ingredient by manipulation of the up 216 and down 218 controls of the increment/decrement selection control 214, until the desired amount is displayed.

The user interface 20 shown in FIG. 2 uses conventional rotary selection switches for the ingredient selection control 204 and the unit selection control 206. It is also possible to use any sort of convenient selection device. For instance, a mode switch can be provided, which cycles through the various modes that the user interface must handle, such as ingredient, units, amount, units type (i.e. weight or volume), etc. Upon selection of the desired mode, up and down switches 216 and 218, or similar switches, can be used to cycle through a list of alternatives, much in the way that stereo and video cassette player user interfaces commonly provide for selection among the modes of input selection, balance, volume, treble and bass levels, speaker set selections, etc. For instance, the list of ingredients can include all of the ingredients listed above, and any other ingredients likely to be used by a baker, as well as factory installed and user provided recipes of combinations of ingredients. Similarly, the units list can include cups, tablespoons, teaspoons, a dash (discussed below), as well as metric volume measurements such as cubic centimeters, liters, etc. The units list may also include weight referenced units, such as ounces (weight), pounds, grams etc.

A dispense control 220 is used when the selections displayed in the display 250 accord with the desired ingredient and amount. Selection of the dispense control causes the specified amount of ingredient to be dispensed from the respective spout to the bowl 62.

Figure 3:
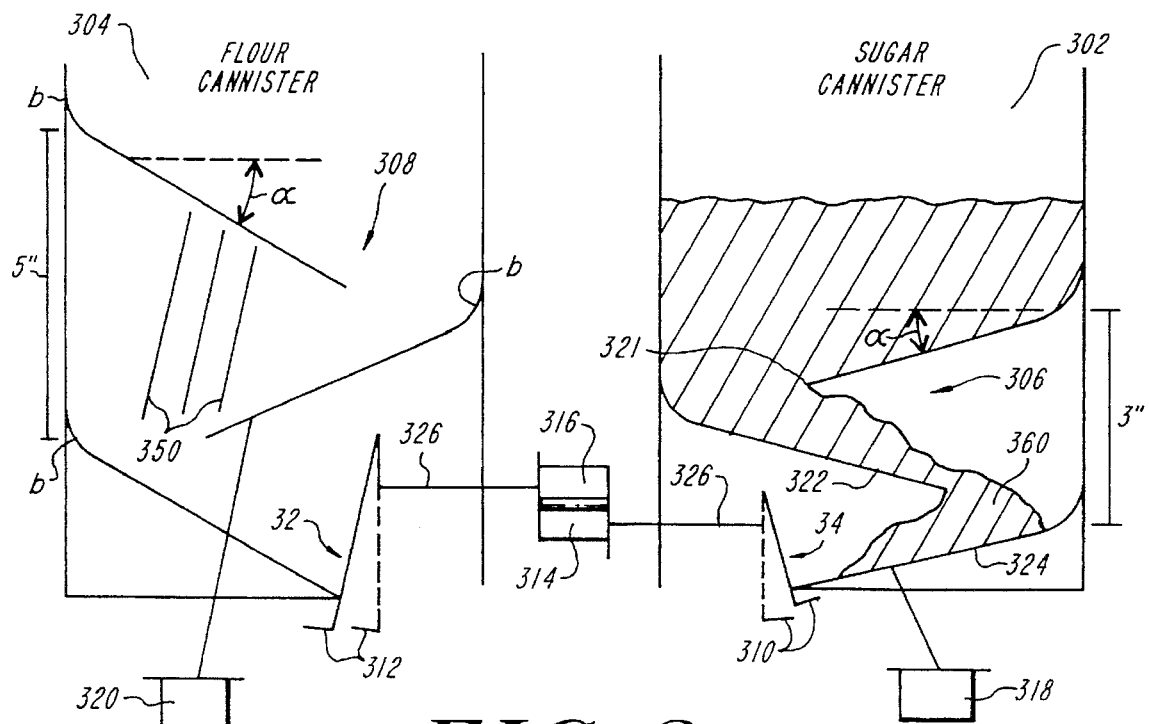
FIG. 3 is a schematic cross-sectional representation of a pair of cannisters of the invention, equipped with a set of baffles for containing and dispensing ingredient.

A preferred means by which ingredient is dispensed from the spouts 32 and 34 is shown schematically with reference to FIG. 3. A first cannister 302 for containing and dispensing sugar and a second cannister 304 for containing and dispensing flour are provided within the housing 10. Each cannister has a suitably sized volume, for instance approximately 20 cups or eight pounds of flour for the flour cannister 304. The sugar cannister may be smaller, since typically less sugar is used than flour in most recipes. The sugar cannister will be discussed as representative. Both cannisters may be essentially identical, except with respect to the dispensing mechanism, as specified below and with respect to their size.

In general, the size of different cannisters is chosen to accord with the typical volume of ingredient used. For less frequently used ingredient, the cannisters may hold only one or two cups, and may be arranged within the housing 10 to take advantage of their smaller size. For instance, they may be stacked one on top of the other, with the upper cannister having a longer spout that passes by the lower cannister.

At the bottom of the cannister 302 is a set of slats 306. Typically, there are three slats: an upper slat 321, a middle slat 322 and a lower slat 324. Adjacent to the lowermost slat 324 is a shutter 310, which selectively closes off and opens the mouth of the spout 34 and the inside of the cannister 302. A solenoid actuator 314 is connected to the shutter 310 through an arm 326 and moves the shutter 310 from an open position to a closed position and vice versa. A voice coil 318, is connected to the lower slat 324, such that when the voice coil 318 is energized, it causes the lower slat 324 to vibrate. (As is mentioned below, the coils used are intended to vibrate, but to make as little audible sound as possible. Thus, "voice" coil is a slight misnomer. However, such is the nomenclature common in the technical field, and it will be adopted here. However, it should be understood that the sounding property is not necessary, or even particularly desired.)

In operation, the user selects which ingredient is to be measured, using the user interface 20 discussed above. Selection of the type of ingredient results in one or the other of the solenoids 314 and 316 and voice coils 318 and 320 being selected. In keeping with the above discussion, it will be assumed that the user has selected the ingredient sugar. After the user has selected the amount to be dispensed, by selecting the units and the number of units to be dispensed, the user pushes the dispense button 220. Pushing the dispense button 220 causes the sugar solenoid 314 to energize, thereby moving the shutter 310 from a closed position (shown in solid line) to an open position (shown in dotted line). FIG. 4A shows schematically the shutter 310 in an open position, with a connection 326 to the solenoid and FIG. 4B shows the shutter 310 in an open position (dotted) moving between a closed position (solid line) and an open position (dotted line).

Pushing the dispense button also causes the voice coil to vibrate (after a short pause, to prevent a large amount from falling out immediately). The voice coil 318 is mechanically connected to the lower sugar slat 324. Vibration of the coil 318 causes vibration of the lower slat 324, which causes vibration of the sugar 360 (shown in cross-hatching) resting upon it. This causes the sugar to move downward along the lower slat 324, and out of the sugar spout 34. Sugar that had been supported above the moving sugar also moves downward, and out of the spout 34. (In most cases, the ingredient will not set up exactly as shown, that shown being only typical. For instance, in some cases, there is no continuity between ingredient resting on the middle baffle 322 and that resting on the lower baffle 324.) The voice coil maintains its vibration and the solenoid 314 keeps the shutter 310 open until the measuring elements of the invention indicate that the desired amount of the ingredient, in this case sugar, has been dispensed.

Variations on the cannister apparatus are discussed below, following the overview of a preferred embodiment of the apparatus of the invention. For sugar, a coil 318 having a dominant frequency of 125 Hz has been found to be adequate, when used in conjunction with slats 306 having a surface similar to coarse grade cardboard commonly used to back writing pads, at an angle $\alpha$ of 15° to the horizontal. For white flour, a coil having a dominant frequency of about 100 Hz has been found to be adequate when used in conjunction with slats 308 inclined at an angle of 25° to the horizontal. Choice of the parameters for the coil frequency, amplitude, and slat angle depends on the mechanical properties of the ingredient being dispensed, such as its density, granular surface structure, cohesiveness, the surface properties of the container 302, the slat surface properties, etc.

The relation between the bowl 62 and the collection platform 60 is shown in more detail with reference to FIG. 6. The bowl 62, rests on the collection platform 60, which in turn is supported by a weighing apparatus 702. Any suitable weighing apparatus is acceptable and the invention is not limited to the specific design shown. In a preferred embodiment, shown in FIG. 7A and 7B, a beam 702 is supported by the housing 4 at a fixed end 704 and supports the weighing bowl 62 at its free end 706. The beam constitutes a weight sensor, and it converts the force applied as a point load P near its free end 706 into a strain along the spring element 702. This strain is concentrated in the four areas 708 and 710 above and 712 and 714 below the two circular cut outs 718 and 716. The strain appears as a tension at the regions 708 and 714, as indicated by the reference character "T" and as a compression at the regions 710 and 712, as indicated by the reference character "C." Strain gages 720, 722, 724 and 726 are mounted in these locations to monitor the load and resulting strain as ingredient is dispensed into the bowl 62. Means for coupling the electric output of the strain gages to the electric circuitry of the apparatus, such as wires, are provided.

In a preferred embodiment, the weight sensors enable the device to measure the weight of ingredient that has been dispensed. When the required weight of ingredient has been dispensed, as sensed by the weight sensor 702, the apparatus terminates the energization of the oscillating coil and causes the solenoid to move the shutter 310 to a closed position. In order to accommodate volume referenced measures, such as cups or cubic centimeters, the apparatus may include a look up table that correlates volume of ingredient to weight of ingredient. The look-up table is preferably maintained in a digital computer memory, such as an EPROM 906, shown schematically in FIG. 11A. The values stored in the EPROM may be stored at manufacture, or can be input by the user, in much the same way that speed dial numbers are stored in contemporary telephones, or that addresses and telephone numbers are stored in digital wrist watches. Such techniques are well known to those of ordinary skill in the art.

Figure 8:
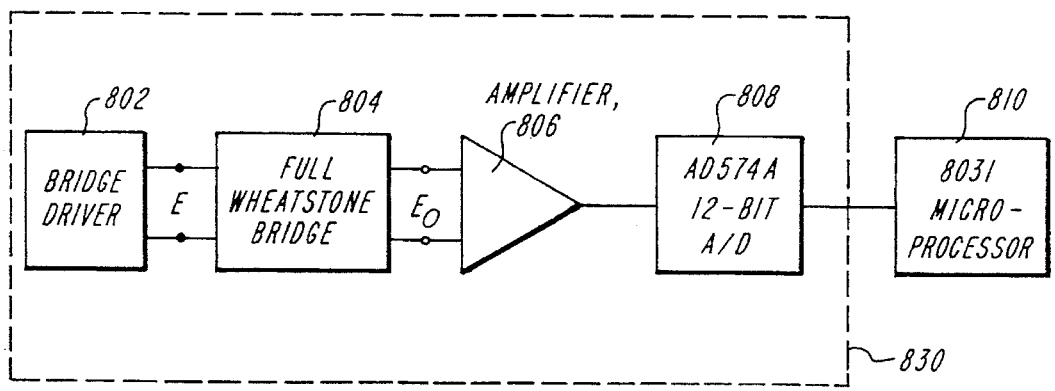
FIG. 8 shows in block diagram form the electrical components of a weight sensor suitable for use with the invention.

The weight sensor 702 includes electrical components, whose interconnection is shown schematically in FIG. 8. The four strain gauges 720, 722, 724 and 726 are arranged in a conventional full Wheatstone bridge configuration. A bridge driver 802 places a precise voltage across the bridge 804. An amplifier 806 converts the output from the bridge 804 to the full zero to ten volt input range of an A/D converter, such as a twelve bit AD574A converter, available from Analog Devices, of Norwood, Mass. (If a wider range of weights is intended to be measured, then a sixteen bit A/D convertor may be necessary.) The output from this converter is provided to a microprocessor 810, such as an 8031 microprocessor, available from Intel Corporation. The output from the converter 808 is monitored during dispensing to determine the amount that has been dispensed to that moment.

Figure 9:
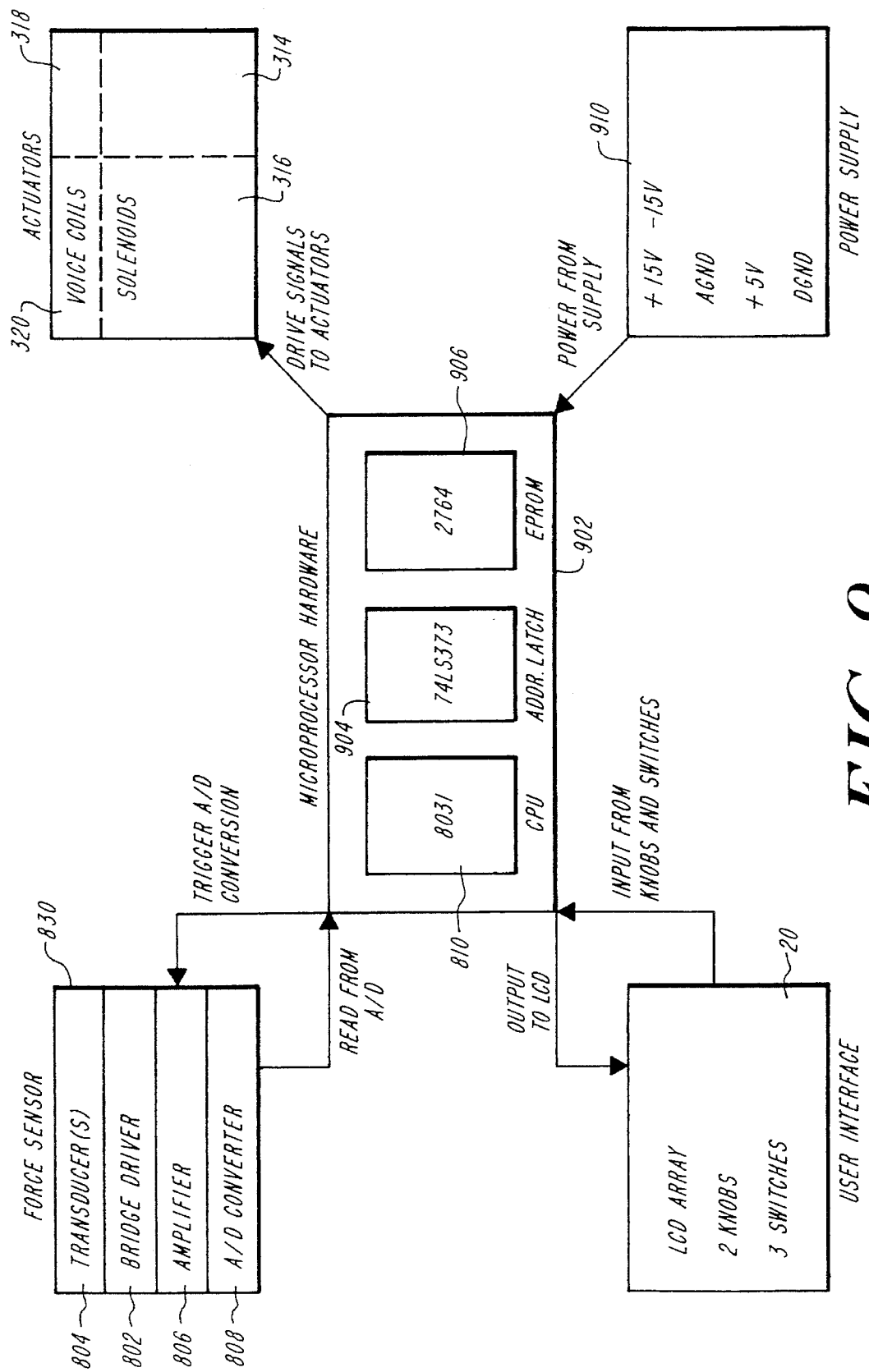
FIG. 9 shows schematically in block diagram form the interaction of the dispensing actuators, the weight sensor and the user interface with a microprocessor suitable for use with the invention.

In a preferred embodiment, a microprocessor manages the user input commands and changes those into signals that are used as control signals for the dispensing mechanism. The microprocessor also governs the energization of the coils 318, 320 and the solenoids 316 and 314, which in turn control the shutters 310 and 312 for the cannisters. The connection among the microprocessor and the other elements of the invention is shown schematically in block diagram form in FIG. 9. Associated with the microprocessor is an octal twenty pin IC address latch 904, such as is sold under trade designation 74LS373 and an 8K 28 pin IC EPROM 906, such as is sold under trade designation 2764. Power for a prototype system comes from an external power supply 910, capable of providing up to 1.3 A at +15 V and −15 V and up to 6A at +5 V. For home use, a smaller power supply would likely be more appropriate.

Figure 10A:
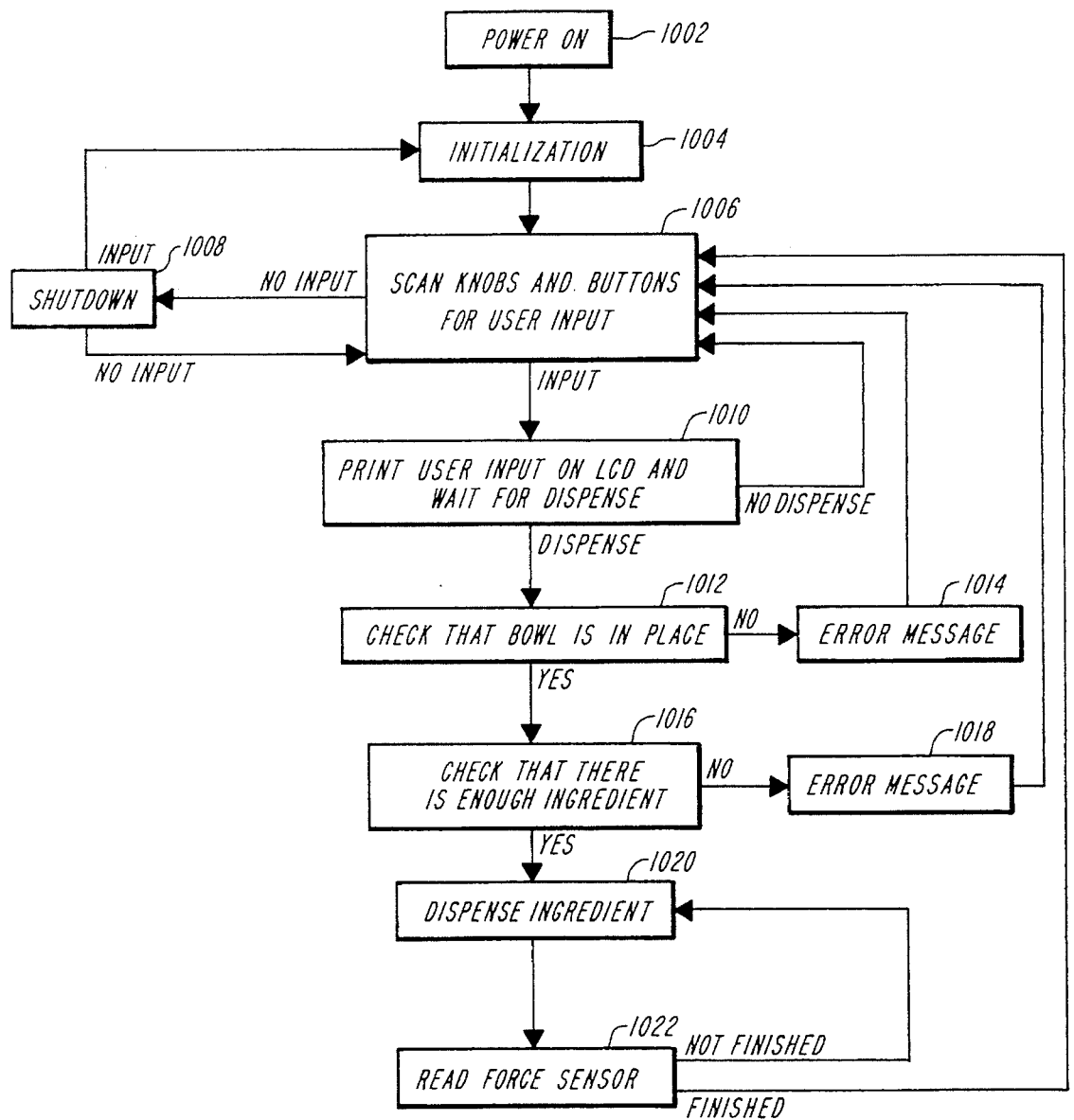
FIG. 10A shows in block diagram form the steps taken by a microprocessor of the invention for a general embodiment of the invention.
Figure 10B:
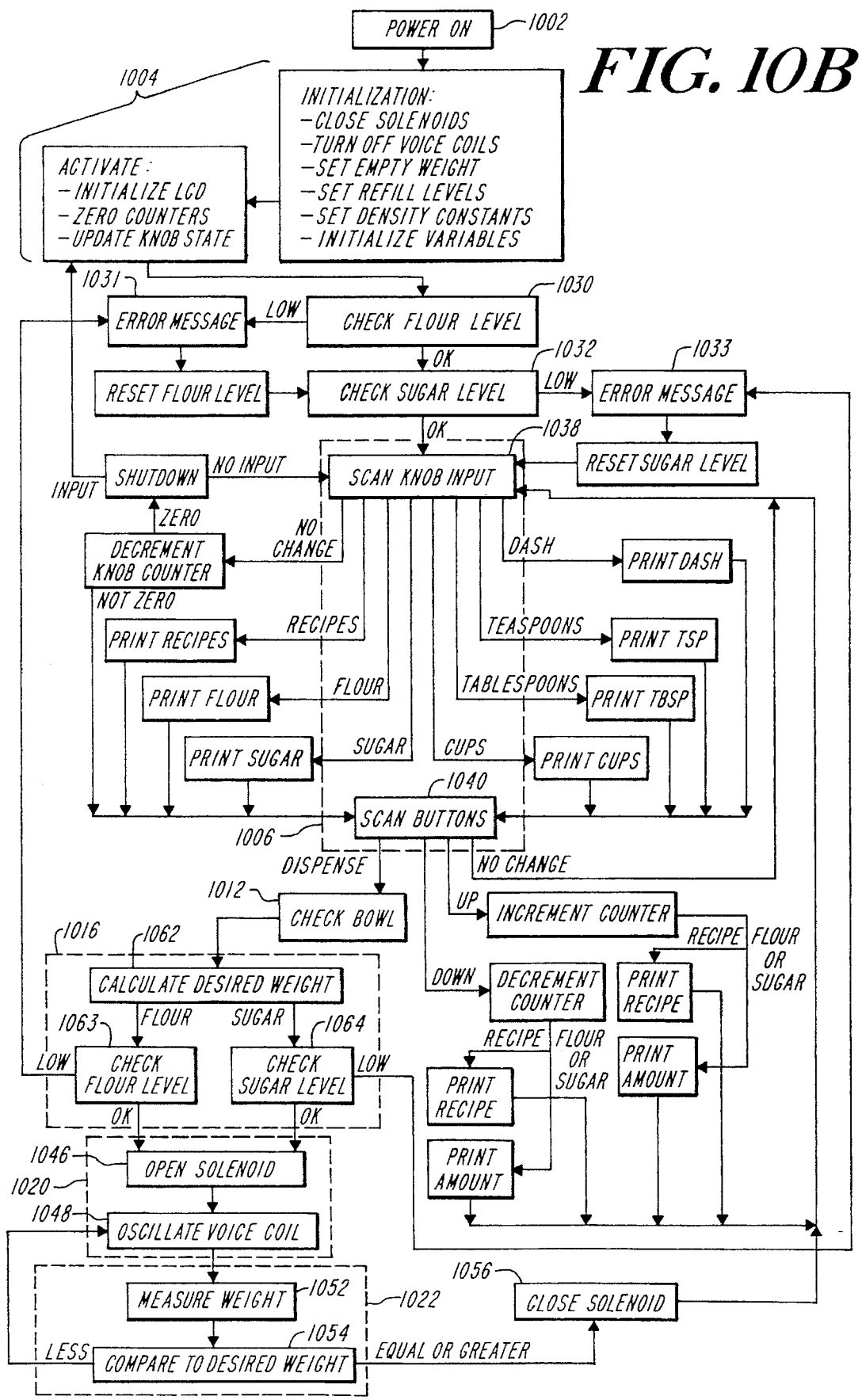
FIG. 10B shows schematically in block diagram form the steps taken by a microprocessor of the invention for an embodiment of the invention having two ingredients to be dispensed, using a solenoid and voice coil dispensing mechanism and a weighing mechanism.
Figure 10C:
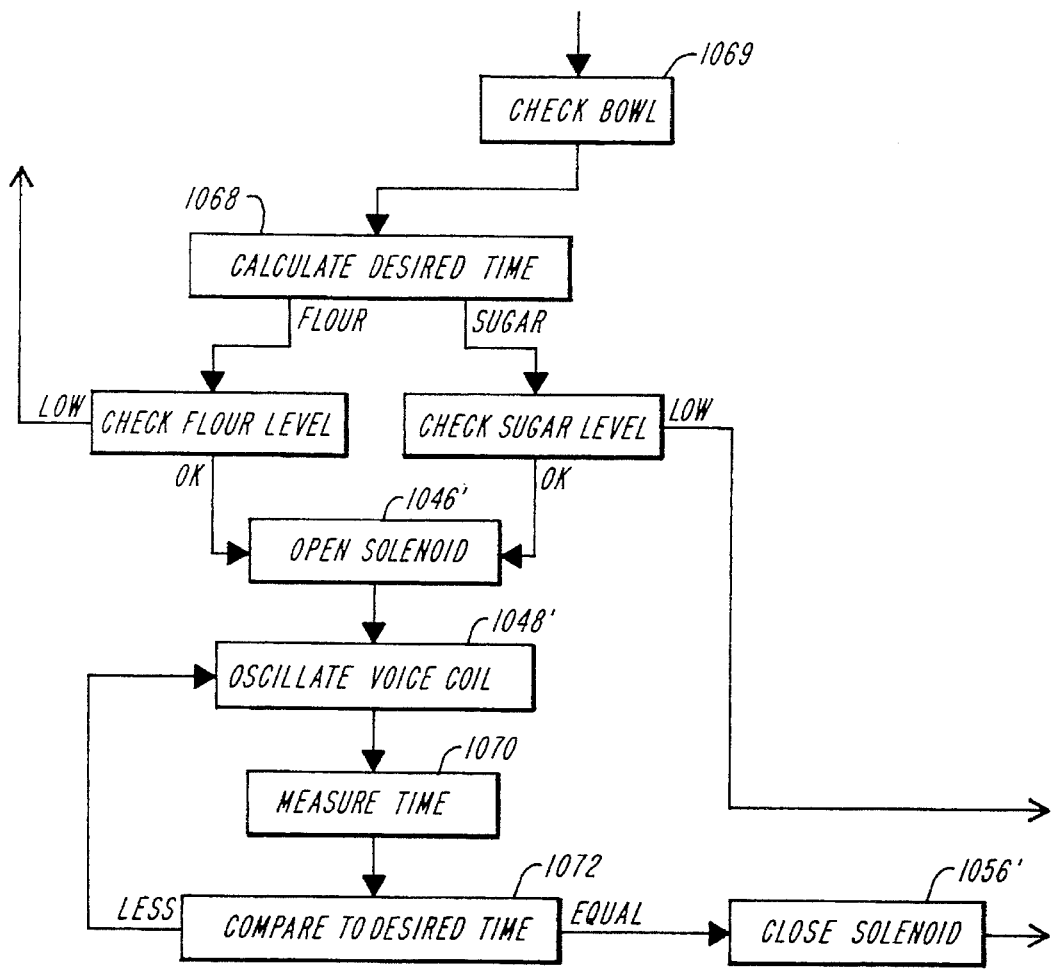
FIG. 10C shows schematically in block diagram form some of the steps taken by a microprocessor of the invention for an embodiment of the invention very similar to that shown in FIG. 10B, however, without a weighing mechanism, which measures amount using a clock and volume flow rates.

The overall block diagram for the steps of a software program to control the actions of the microprocessor 810 for one embodiment of the invention is shown schematically with reference to FIG. 10A. FIG. 10B shows these program steps in more detail. (FIG. 10C shows program steps for an alternative embodiment of the invention, which determines the amount of ingredient dispensed by controlling the flow rate and the duration of dispensing, rather than by weighing.)

Upon power on 1002, the microprocessor conducts an initialization routine to reset the apparatus to a state desired, to eliminate the effects of any spurious register states that may have arisen during power off or power on. The initialization includes closing the solenoids (they should already be closed), turning off voice coils (they should already be closed), setting a memory register with a weighing stage empty weight, also referred to as a "no bowl" weight," setting a memory register with the refill levels and setting memory elements with density constants. All of these values are stored in the EPROM 906 and are loaded from the EPROM 906 to appropriate registers or memory locations under control of the microprocessor 810. The no bowl weight is a weight to which the microprocessor compares the measured weight, to insure that a bowl is present. The refill levels are cannister levels, below which, the cannisters should be refilled. The density constants are the densities of the various ingredients to be used. Other variables used by the program steps are also initialized. Further, the display is initialized, the place keepers for the increment and decrement counters 216 and 218 are initialized and the knob state is updated.

The microprocessor scans 1006 the user input knobs and buttons from the user interface 20 and prints 1010 an output to the display 250. At this point, the microprocessor waits for the dispense button to be pushed, thereby generating a dispense signal. While waiting for the dispense signal, the microprocessor continues to scan 1006 the user input knobs and buttons.

The microprocessor checks 1012 to determine whether a measuring bowl 62 is in place by comparing the measured weight (indicated by a number of counts generated by the A/D convertor) to the no-bowl weight set at initialization. If the measured weight is less than the no-bowl weight, then, no bowl is in place. If no bowl is in place, an error message is printed 1014 to the display and the microprocessor returns to the step of scanning 1006 the user input knobs and buttons. If the user again pushes the dispense button, the microprocessor again checks to determine that the bowl is in place. If it is, the microprocessor branches to the step of checking 1016 that there is enough ingredient in the cannister for the requested amount. The volume of ingredient in the cannister has been monitored by recording the initial amount based on either a user input or a default, monitoring the amount that has been dispensed, and subtracting that amount from the cumulative running amount. If the supply of ingredient is inadequate, an error message is printed 1018 to the display and the microprocessor again returns to the step of scanning 1006 the user input knobs for inputs.

If on the next pass, the user has replenished the ingredient supply cannister, the checking step 1016 will return a "yes" result, and ingredient will begin to be dispensed 1020. As shown in FIG. 10B, based on the inputs from the user input 20, the microprocessor selects which cannister's (e.g. flour or sugar, etc.) solenoid is to be opened 1046 and which coil is to be oscillated 1048. For instance, it may be that the flour solenoid 316 and its associated voice coil 320 are to be energized.

The microprocessor also signals to the force sensor 830 to convert the voltage output from the transducer bridge 804 to a signal indicative of a weight, thus measuring 1052 the weight. The microprocessor reads 1022 the force sensor signal and compares 1054 this weight signal to a weight signal limit that it has calculated for the requested volume of ingredient. If the amount of ingredient selected has been specified by weight, for instance grams, this amount is compared to the weight sensed by the sensor. The microprocessor receives an output from the analog to digital convertor that is a number of counts, which is correlated to a weight, as determined by the designer according to techniques well known in the art. For instance, if a 12 bit A/D convertor are used, that provides a maximum of 4096 divisions into which to divide the total weight range of measurement. Typically, some of the divisions are used as buffers to insure the convertor will not be saturated. The correlation between counts and weight are maintained in the EPROM, or in the software program steps. When the weight in the bowl equals the weight called for by the weight limit signal, the microprocessor signals the voice coil to stop vibrating.

The ingredient amount may also be specified by volume, rather than weight. This entails an extra step, namely calculating 1062 the weight limit signal, which the microprocessor will use to terminate dispensing, from the volume. This is accomplished using a stored density of the desired ingredient. The density for each ingredient is stored in a memory location (either a register, or the EPROM or a RAM memory location). The density for the ingredient indicated by the ingredient selector 204 is selected. Typically, this density is expressed as a number of "counts" or "clicks" output from the analog to digital convertor, per a unit volume, typically the smallest volume to be measured, for instance, a teaspoon. The total desired number of counts is calculated, by first determining how many teaspoons (or whatever measure is used for the density table) are included in the requested volume measure and then applying the density per teaspoon (or whatever measure) to the total measure, to obtain the total desired number of counts. Afterward, the steps of the program that the microprocessor follows are as discussed above.

If the force sensor weight signal is less than the weight limit signal, the dispensing is not finished, and the microprocessor returns to continue to dispense 1020 ingredient, and again reads 1022 the force sensor weight signal. If the weight signal equals or exceeds the weight limit signal, the microprocessor discontinues the energization signal to the voice coil, and signals the solenoid to close 1056 the shutter, thereby terminating dispensing of ingredient. It then returns to scan 1006 the user input knobs and buttons, ready to dispense the next ingredient, or to simply wait to be powered off.

(According to another embodiment, discussed at the end of this specification, rather than testing for the weight of the ingredient dispensed, the apparatus determines the volume dispensed by monitoring the flow rate and duration of dispensing. This is discussed below.)

Some of the steps that the microprocessor conducts which have not been explained above are shown in more detail in FIG. 10B. After initialization, the microprocessor checks 1030 the flour level and checks 1032 the sugar level (as well as the level of any other ingredient cannisters that are installed.) When the cannisters are refilled, they are refilled to a set amount, known to the microprocessor. The microprocessor keeps track in an EPROM memory location of the volume remaining, by subtracting the volume of each ingredient dispensed from the volume present prior to dispensing. If this remaining volume falls below some set "refill" volume as determined by the microprocessor check step 1030 for flour (1020 for sugar), an alert message 1031, 1033 is provided to the user, through the user interface display 202.

The step of scanning 1006 the knobs and the buttons includes scanning 1038 the knob inputs and scanning the button inputs. Based on the knob inputs, the microprocessor will cause a message to be printed on the display, corresponding to the knob input, such as "flour," "sugar" or "recipe" for the ingredient knob; and "dash," "tsp," "Tbs" or "cups" for the units knob. Based on scanning 1040 the buttons inputs, the microprocessor will print on the display an amount, or a specific recipe, for instance: "cookie dough" or "bread" or "pie crust," etc. Each time the microprocessor prints an amount or recipe to the display, it returns to the step of scanning 1006 the knobs and the buttons, for changes, particularly for incrementing or decrementing of the up 216 and down 218 counter buttons, that govern the display of the amount and the different recipes.

The apparatus also checks at 1063 and 1064 to insure that the remaining volume (of, e.g. flour or sugar) exceeds any amount that the user has specified is to be dispensed, by comparing the amount requested to be dispensed to the remaining amount. Again, an alert message is provided 1031, 1033 if there is not enough ingredient available.

The foregoing describes a system in general. Certain characteristics have been found to provide acceptable results. In the interest of illustrating the general principals of the invention, these characteristics are identified below. However, they should not be taken to limit the generality of the invention.

The cannisters for containing the ingredient (304 and 302) may have steep sloping sides and rounded inner corners (if corners are present) to prevent ingredient being trapped and building up in corners. The inside corner between the slats and the side wall should have a radius b, as shown in FIG. 3, to prevent ingredient from getting trapped. The angle of inclination of the slats 306, 308 and the frequency of oscillation of the coils 318, 320 should be optimized for the ingredient being dispensed. For flour, an angle $\alpha$ of 25° to the horizontal) and a vertical displacement of 2.5 inches between the bases of adjacent slats (as shown in FIG. 3) was used. For sugar, an angle $\alpha$ of 15° to the horizontal and a vertical displacement of 1.5 inches was used.

The general principals governing slat placement and inclination are as follows. If the slat displacement is too large, ingredient runs off too quickly and either completely runs out or clogs the lowest slat (particularly when the shutter 310 is closed), thereby slowing the flow. If the displacement is too small, there is not enough clearance for proper flow, and again flow is slowed. At an effective displacement and at optimal ingredient velocity, the shear of the moving ingredient drags the ingredient above down to the next slat.

If the slat angle is too great, all of the ingredient completely flows through the apparatus and fill the entire lowest slat of the cannister, such that when the shutter is opened, a huge amount of ingredient is dispensed. If the angle is not great enough, ingredient would not properly come out during vibration.

In order to vibrate the slats, voice coils can be used, secured under and coupled to the bottom slat 324 of each cannister. Coupling the voice coil to the middle slat 322 also (as shown in the case of the flour cannister) increases the effectiveness of dispensing. (This can be done simply by passing a rigid member through the bottom slat, securing it to that slat, for instance with adhesive, and continuing it to the middle slat, where it is also attached with adhesive.) The dispensing is also dependent upon the frequency and amplitude of the coil oscillation. As amplitude is increased, flow also increases, rapidly. Both the frequency and the amplitude should be adjusted for the type of material being dispensed. Generally speaking, to a certain point, as the frequency is increased, flow increases. Similarly, increased amplitude also increases the flow rate. The designer will readily be able to determine an appropriate amplitude and frequency, depending on the ingredient to be dispensed, the power capabilities of the voice coil being used, and space considerations. A square wave, from 0 to +4 V (1 V drop over the drive chip) was used for each voice coil. Frequencies of 125 Hz for sugar and 50–100 Hz for flour were used. However, higher frequencies for both are expected to provide better results.

Using voice coils designed for audio speakers has a drawback of being noisy at the frequencies listed above. The voice coils chosen should make as little audible noise as possible, within the price and power parameters chosen by the designer.

Figure 14:
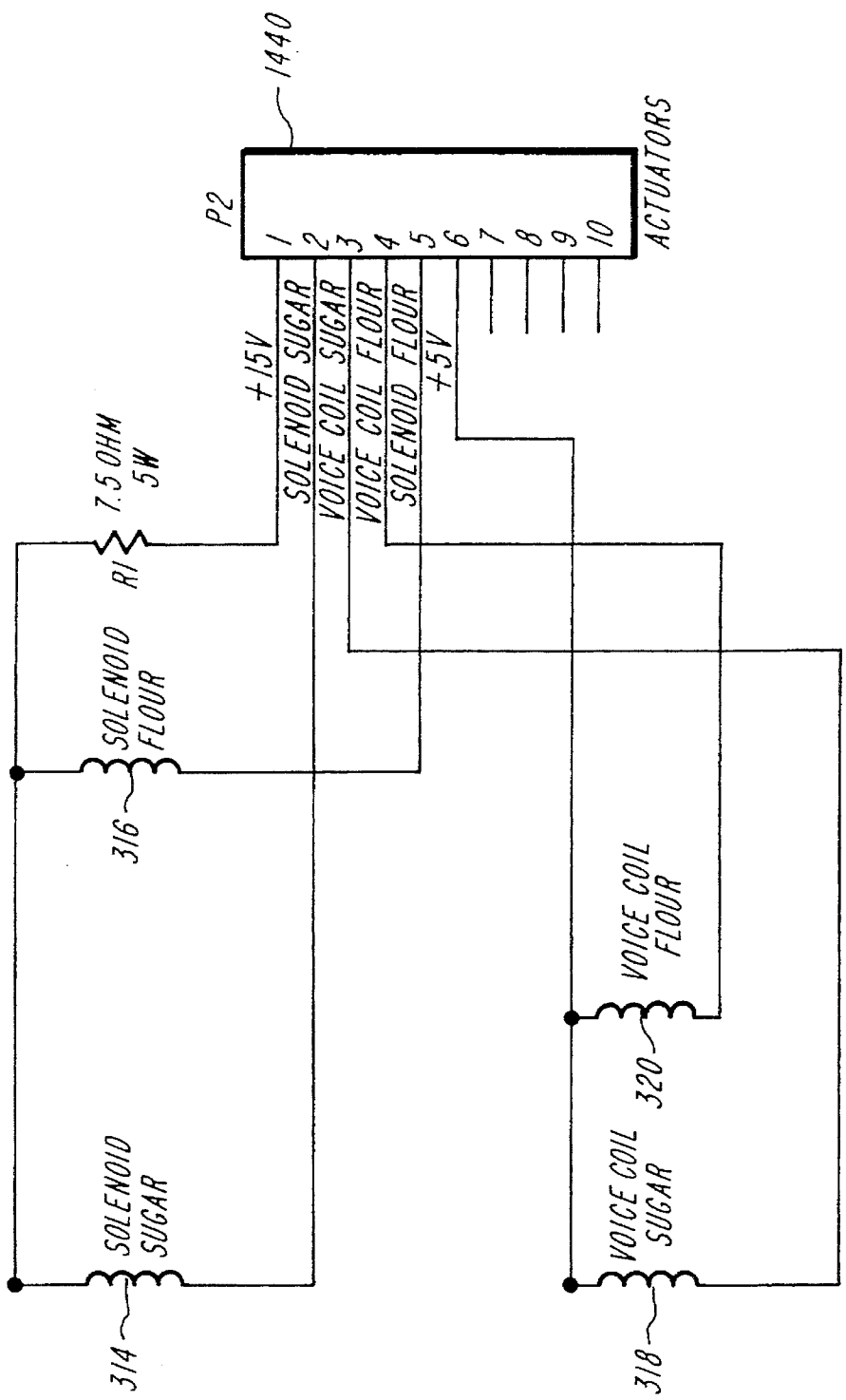
FIG. 14 shows schematically electric circuitry for connecting solenoids and voice coils to a microprocessor for opening the cannisters and urging ingredient to be dispensed.

The shutter system uses solenoids 316 and 314 for activation. The shutters are actuated with a relatively small force and short throw specifications. As shown in FIG. 4A, a virtually frictionless rotating door 310 is held shut against the bottom slat 324 by an arm 326 connected to the core of the solenoid in its rest position. When the solenoid core is energized and retracted, the door swings open due to gravity. In order to have the door travel further than the throw of the solenoid, the point of connection 430 between the solenoid and the shutter is at a smaller radius $r_1$ than the point $r_2$ at which the shutter 310 meets with the lowermost slat 324. To be able to supply enough force to close the shutter 310, the solenoid is driven with seven volts, as shown schematically in FIG. 14.

The shutter should have a good seal against ingredient leakage and insect infestation. Such a seal is shown schematically with reference to FIG. 5. The shutter door 310 is provided with a soft rubber pad 502 around its edges. The pad engages the edges of the spout opening 34, and the underside of the body of the slat 324. Typically, the seal is U-shaped, with the bottom portion of the U bent, so that from the side, it is L-shaped.

Figure 7A:
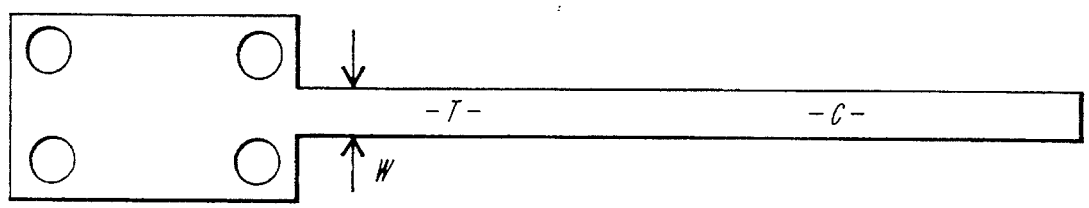
FIG. 7A shows in a plan view one embodiment of a weight sensor suitable for use with the invention.
Figure 7B:
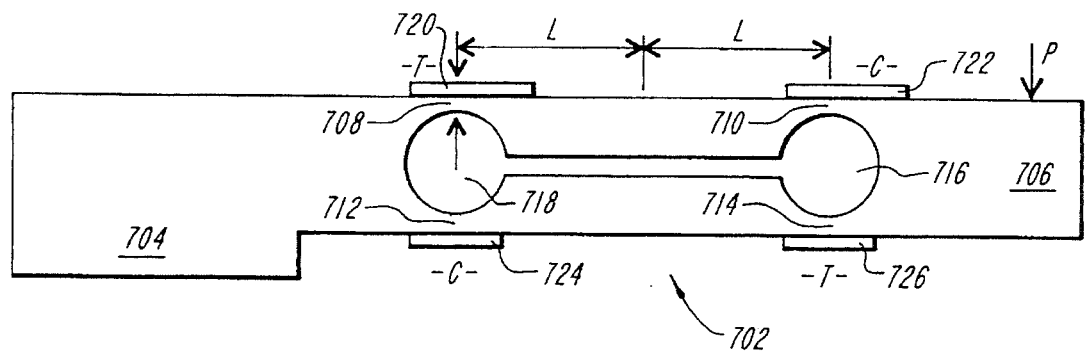
FIG. 7B shows in an elevation view the weight sensor shown in FIG. 7A.

A special weight sensor is shown in FIG. 6 and FIGS. 7A and 7B for use with the invention, however, any suitable weight sensor can be used. The weight sensor shown is a "binocular" spring element. It is similar to a simple cantilever, however, it is inherently stiffer, being a coupled dual-beam. Further, the binocular beam is relatively insensitive to the point of load application on the loading platform when used in a full bridge configuration. It is also relatively easy to manufacture. For more information on such beams, see "Strain Based Transducers, Their Design and Construction" by the technical staff of Measurements Group, Inc. of Raleigh, N.C. Such a configuration provides a higher stiffness to weight, or volume, thereby permitting a relatively compact design.

A binocular spring element approximately obeys the following strain equation of applied point loads:

$$e = \frac{3,000,000 \, PL}{EWT^2} \quad (1)$$

where e is strain in microinches per inch, P is the point load in pounds, L is half the distance between the centers of the two large holes 718 and 716, as shown in FIG. 7B, in inches, E is the Young's Modulus of the beam material in pounds per square inch, W is the width of the beam in inches and T is the thickness of the beam at the center of the holes 718 and 716, in inches.

The resolution of the device must be evaluated in terms of the smallest amount of the least dense ingredient to be dispensed. Typically, this would amount to something on the order of one teaspoon of flour, and ¼ teaspoon of sugar. One teaspoon of flour typically weighs 2.92 grams and 1/16 teaspoon of sugar weighs 2.71 grams. Converting to pounds, brings the desired sensor resolution to 0.0006 pounds. A 12 bit A/D converter has 4096 units, and this determines the maximum range for the desired resolution to be 2.46 pounds. (If a finer resolution were required, for the same dynamic range of approximately 2.5 pounds, it would be necessary to use an A/D convertor having more bits, such as a 16 bit convertor, or to take some other action, such as using nonuniform steps depending on the weight. It would also be possible to obtain finer resolution by decreasing the dynamic range to less than 2.5 pounds.)

A suitable design rule for the spring element is to produce between 1000 and 1500 microstrain at the maximum load. Therefore, the design target is 1000 microstrain at P= 2.46 pounds. The low end of the microstrain range allows the sensor bridge to be balanced (zeroed) with some load on the element (from the loading platform and the bowl, for example) while maintaining the capability to add 2.46 pounds without exceeding 1500 microstrain. Aluminum, having E= 10,000,000 psi is suitable for the beam. A width W of 0.25 inches can comfortably support a strain gage such as is sold by Measurements Group under trade designation number EA-13- 120LZ-120. This strain gage has a temperature coefficient suitable for use with aluminum. It is approximately three mm wide by eight mm long (with only 3 mm being occupied by a grid. It is a linear 120 ohm gage. Smaller strain gages can also be used. A thickness of T=0.0625 was chosen as a size convenient to machine under the prototype circumstances. With these dimensions, L may be calculated to be 1.3 inches. The actual strain measured under 2.46 pounds is 978 microstrain. To produce 1500 microstrain, requires 3.76 pounds. This leaves 1.3 pounds for the collection platform 60 and the bowl 62. If manufacturing conditions permit making the thickness T smaller, that may also be done.

Figure 12:
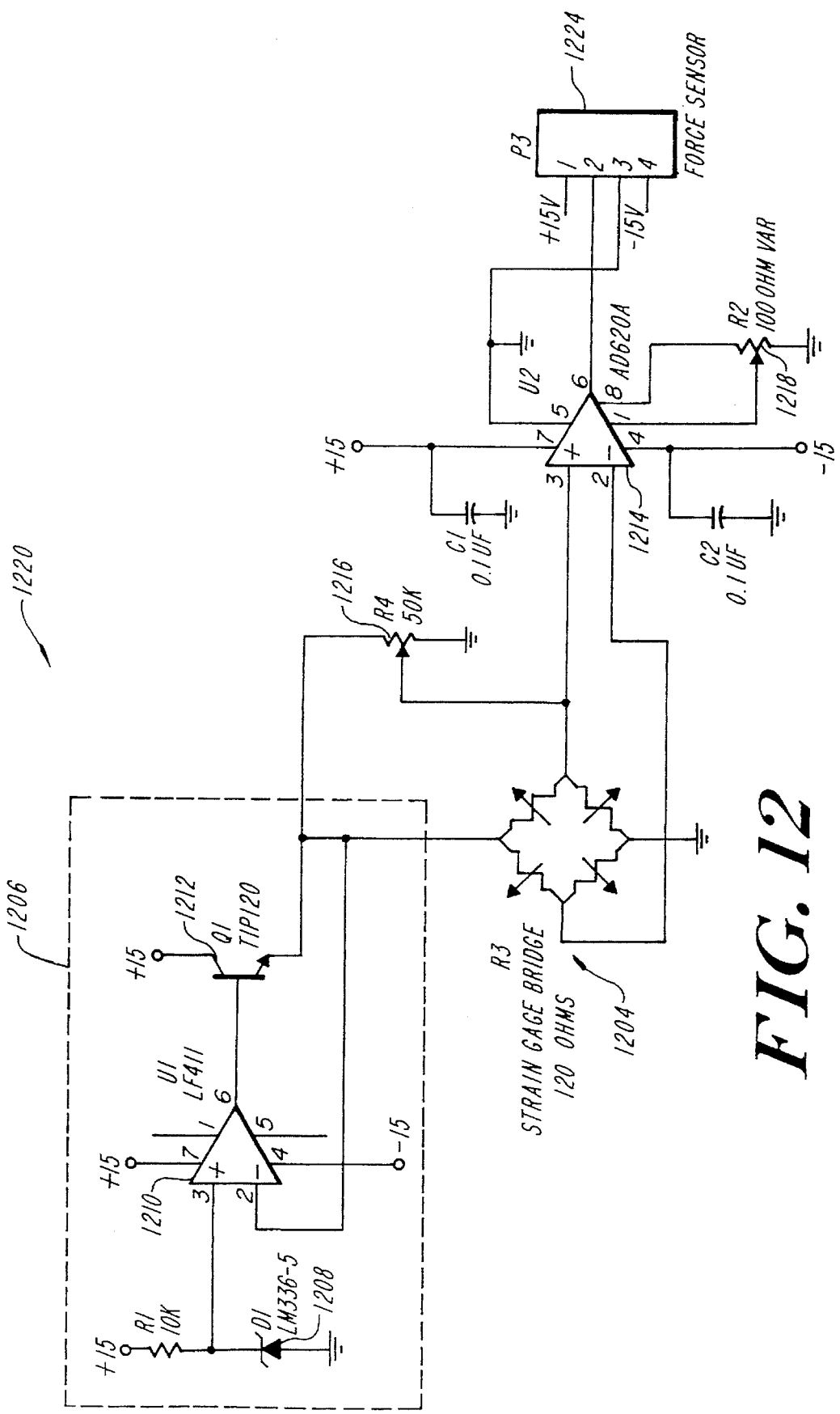
FIG. 12 shows schematically an electric circuit for the strain gage bridge driver and amplifier for use with the weighing portion of the invention.

An electrical circuit suitable for use with the strain gages is shown in FIG. 12. A full Wheatstone bridge configuration is used for the gages 720, 722, 724 and 726, because its output is proportional to the change in resistance of a gage divided by the actual resistance. This provides some insensitivity to both temperature and changes in supply voltage. The full bridge (as opposed to a half bridge, for example) also produces the maximum output voltage for a given input voltage. This is important for dealing with the low level of signal produced by resistance changes in the gages.

A bridge drive circuit 1206 was used to provide a stable 5 V supply to the bridge, consisting of an LM 336-5, 5 V voltage regulator 1208, an LF411 FET input op amp 1210 and a TIP120 NPN Darlington power transistor 1212 used to increase the output current capability of the drive circuit. The output of the bridge is:

$$\frac{E_0}{E} = .001 \, Fe \quad (2)$$

where $E_0$ is the output voltage, E is the bridge supply voltage, F is the gage factor and e is the strain. For this design, F=2.11. With the 5 V bridge supply, the bridge output at maximum strain of 1000 microstrain is 15.825 mV.

This bridge output strain is amplified using an AD620A instrumentation amplifier 1214. A 50k Ohm variable resistor 1216 balances the bridge at the desired zero point and a 100 ohm resister 1218 varies the amplifier gain. The amplifier gain is related to these resistor values by the following:

$$Rg = \frac{49.4}{G-1} \quad (3)$$

where Rg is the gain resistor 1218 value in K ohms and G is the gain.

In a prototype model, the sensor/convertor system was set to read 50 counts on the A/D converter with the loading platform 60 (but no bowl) in place. The force sensor by itself is very stable, and only caused this reading to vary by one count in either direction statically with time. The amplifier gain was set so that with a 1000 gram load on top of the platform, the A/D converter would read 4058. This was done so that any vibrational noise introduced by the voice coils would not saturate the A/D converter at either end of its range. The apparatus can be calibrated by applying a series of weights (100 g to 1000 g in increments of 100 g). This produces the conversion of 4.008 counts/gram used in the user interface program.

Figure 13:
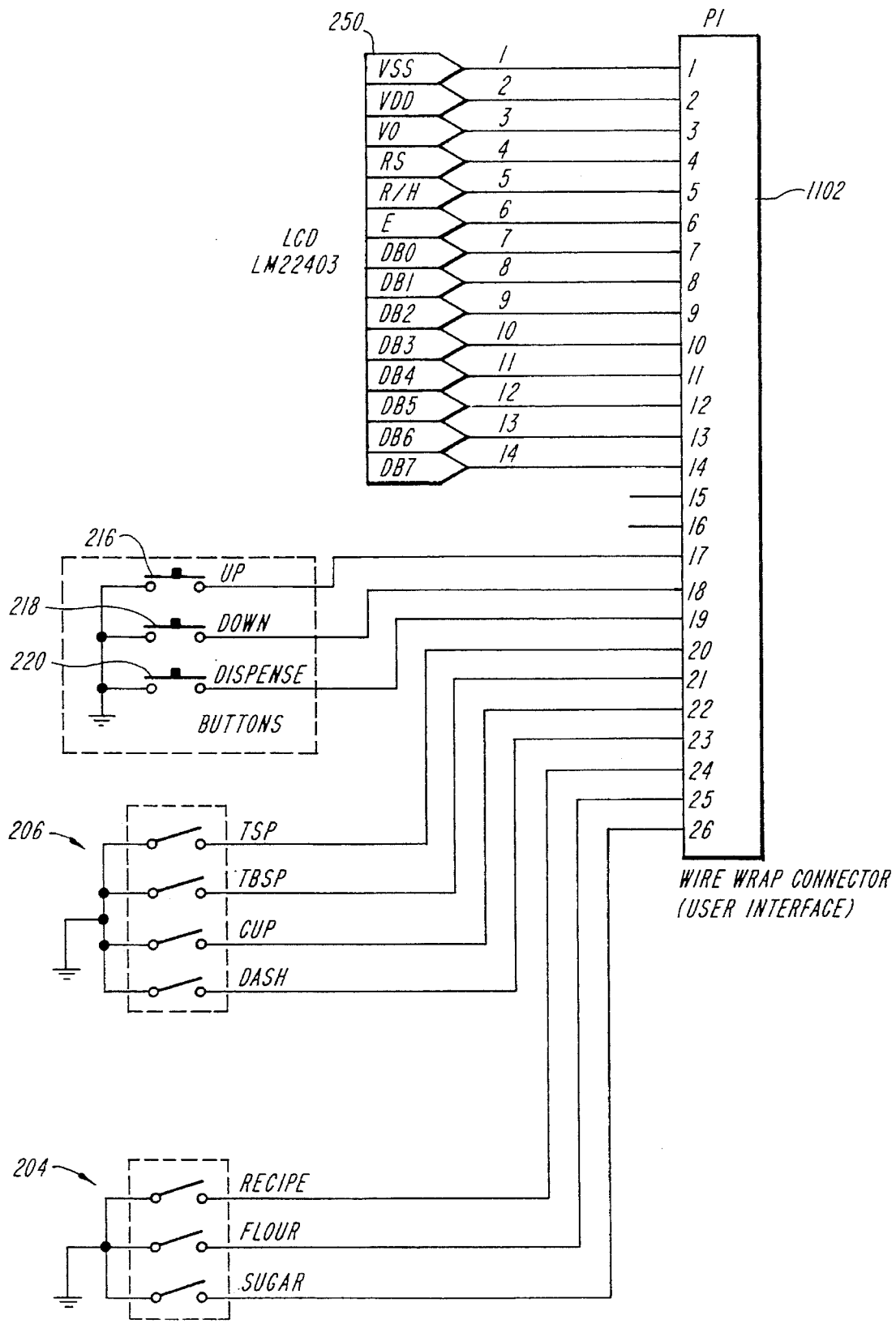
FIG. 13 shows schematically an electric circuit for connecting the user interface switch panel to the main circuit shown in FIGS. 11A, 11B, and 11C.

As shown in a schematic circuit diagram shown in FIG. 13, in a preferred embodiment of the user interface of the invention, the ingredient and units selection knobs 204 and 206 are two - pole, six position rotary switches (not all of the positions are used, and therefore, they are not shown in FIG. 13). The increment 216 and decrement 218 and dispense 220 switches are momentary push button switches. The display 250 is a two line, twenty-four character liquid crystal display. If the units switch is set to specify a dash the microprocessor signals the ingredient to be dispensed as long as the dispense button 220 is depressed. For this embodiment, a twenty-six wire cable connection 1102 connects the user interface 20 to the microprocessor 810, as shown schematically in FIGS. 11A and 13.

The layout of the user interface 20 shown in FIG. 2 is convenient. The rotary knobs 204 and 206 are below the display 250, so that the user's view of the display is not obstructed as the knobs are turned. The dispense button 220 is near the scroll buttons 216 and 218 so that once the correct amount or recipe is selected, it is easy to press the dispense button 220. Of course, other layouts for the user interface are within the contemplation of the invention. The display 250 can be larger, or can use a different medium, such as light emitting diodes. Rather than rotary switches, scroll and mode buttons can be used.

Figure 11B:
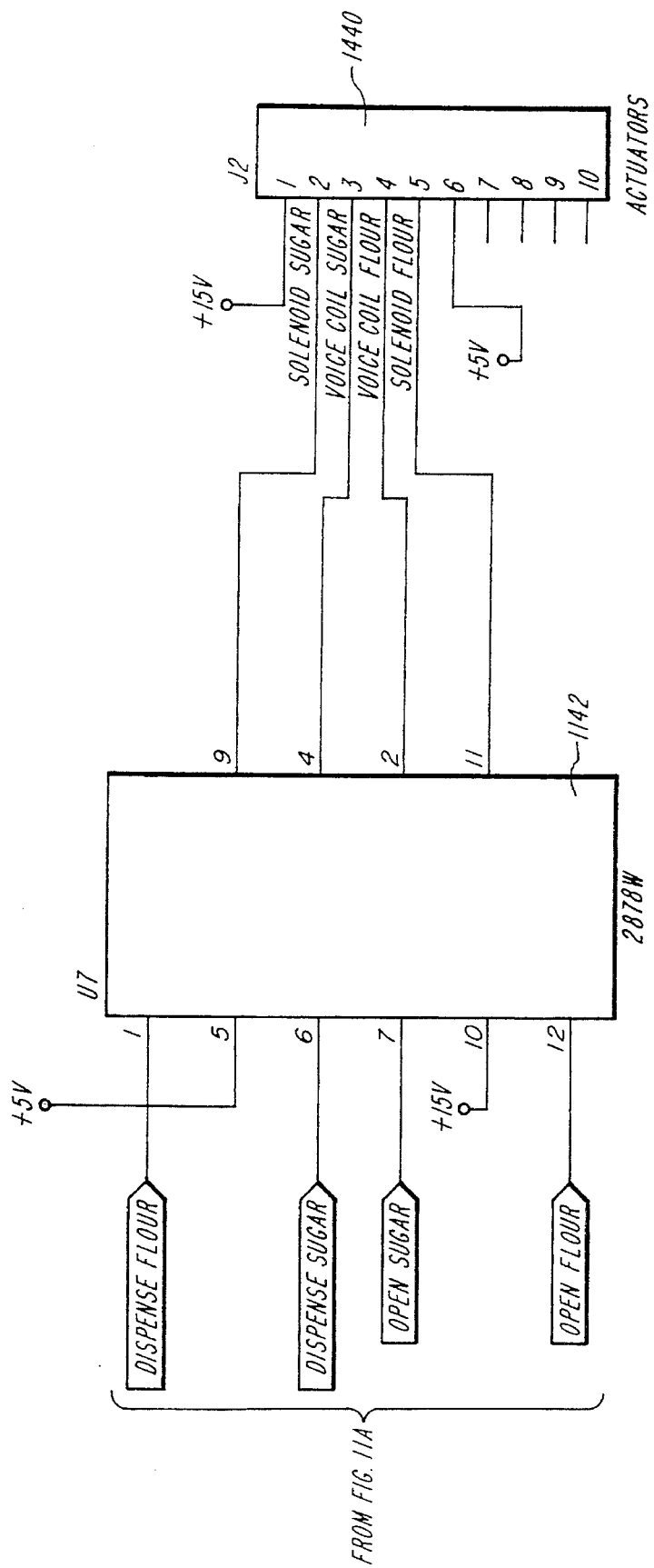
FIG. 11B shows schematically another portion of the main circuit shown in FIG. 11A, showing principally a driver for delivering analog power in response to a digital signal.

The connections between the microprocessor 810 and the user interface, dispensing actuators (oscillating coil and solenoid) and the weighing sensors, for a preferred embodiment are shown schematically with reference to FIGS. 11A, 11B, 11C, 12 and 13. All of the microprocessor functions are activated by the ten switch ports of the user interface 20, comprised of one each for the up 216, down 218 and dispense 220 switches, and four and three for the units 206 and ingredient 204 switches, respectively. The three from the increment, decrement and dispense switches (pins 17, 18 and 19 of the 26 wire connector 1102) are directly connected to three individual bits of the eight bit parallel I/O port #1 of the microprocessor CPU 810 (FIG. 11A). The other seven (pins 20–26 of the wire connector 1102) are connected to the microprocessor indirectly, through an address bus 1104 and a data bus 1106, by means of a buffer 1108, such as sold under trade designation 74LS244. Switch data is put on the data lines when triggered by both the read line 1117 and an address line (A14) of the microprocessor 810. Writing to the display 250 is done via the address and data lines when triggered by both the write line 1116 and a different address line (A15) of the microprocessor 810.

Figure 11C:
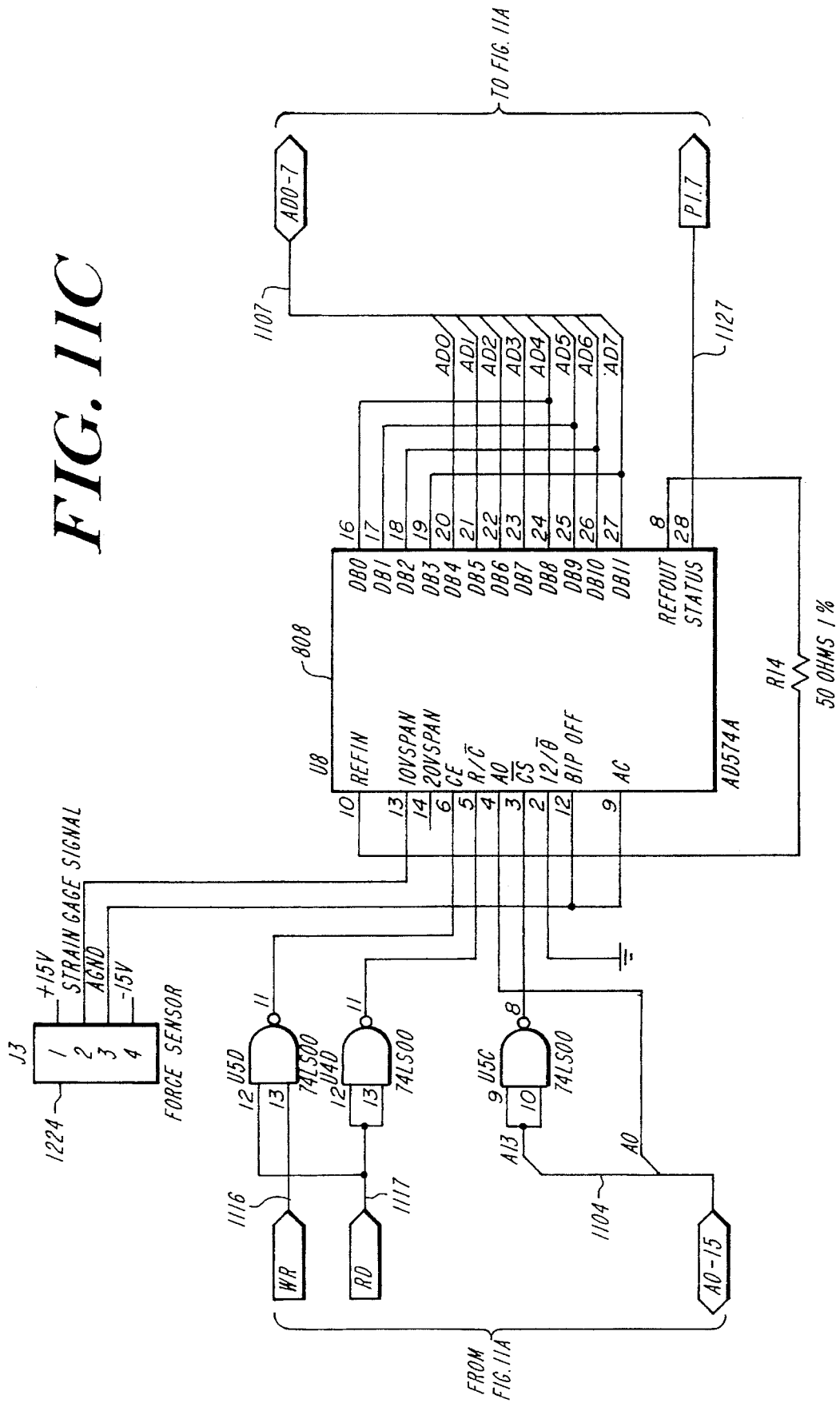
FIG. 11C shows schematically another portion of the main circuit shown in FIG. 11A, showing principally an analog/digital convertor to interface between a weighing circuit and a microprocessor.

The weight/force sensor 1220 (FIG. 12) is connected to the microprocessor through a connector 1224 (FIGS. 12 and 11C) that is connected to the A/D converter 808 (FIGS. 11C and 8). The microprocessor 810 triggers an analog to digital conversion using the read 1117 and write 1116 lines and an address line (A13) of the address bus 1104. Data is transferred using the address bus 1104 and the data bus 1106 of the microprocessor 810. The status of the A/D converter is monitored with bit 7 of the parallel I/O port #1 of the microprocessor 810.

The dispensing actuators (FIG. 14) are interfaced to the microprocessor 810 through a ten pin connector 1440, through four bits of the parallel I/O port #1, with one bit for each of the oscillating coils 318 and 320 and solenoids 314 and 316. In between the microprocessor 810 and the actuators is a Quad High Current Darlington switch chip 1142, such as sold under trade designation 2878W, which accepts simple high and low signals from the bits of the microprocessor and generates a signal that activates the voice coils 318 and 320 and the solenoids 314 and 316. A software subroutine provides the needed signal change frequency to oscillate the voice coils 318 and 320.

A representative means by which the apparatus of the invention determines when the required amount of ingredient has been dispensed has been described briefly above, for the case when the amount is specified by volume, as is typical. Initially, the EPROM 906 has stored in it densities of various different ingredients, in units of A/D convertor counts per volume. Typically, the volume is the smallest that the apparatus is designed to dispense, such as a ¼ teaspoon, or some other convenient volume, such as a teaspoon. Before the EPROM is loaded, the weighing apparatus has been calibrated in terms of A/D convertor counts per unit weight. All of the density constants are set into variable microprocessor memory at the initialization stage 1004.

The microprocessor scans the output of the ingredient selection knob 204 and identifies which density constant to use. It also scans the amount knob 206 output to determine how much of the amount is to be used, multiplying the two together to arrive at a number of counts that the A/D convertor will generate as a weight limit signal when the desired amount is on the weighing stage. Periodically, the microprocessor compares the then current A/D output to the weight limit signal. When the two are equal, or the A/D output exceeds the weight limit signal, the microprocessor ceases the energization of the voice coil, and closes the shutter 310.

Similarly, if recipes are stored in the EPROM, the amount for each ingredient will be taken by the microprocessor, and used as a weight limit signal for each different ingredient. If the amount is specified by weight, the microprocessor need not make any calculations based on ingredient density, but merely calculates the number of A/D convertor counts to set as the weight limit signal.

The embodiments described in the foregoing specification are representative of the invention, however, not exhaustive. While only two cannisters have been shown, for clarity, typically, more would be used, for instance five, containing flour, sugar, baking soda, baking powder and salt. Additional cannisters could be provided for different types of flour (whole wheat, rye, oat, etc.) corn meal, coffee, chocolate chips, nuts, etc. The cannisters may be stationary, or may be provided on a rotating carousel, which brings the activated cannister adjacent to the mixing bowl. It is also possible to provide that the cannisters be easily removable, and replaced with another cannister. The cannisters may be provided with coding, either mechanical (cams, pins, etc.) optical (bar code) or electrical (bit code) to communicate to the microprocessor their contents. It may also be convenient, depending on the size of device, to provide more than one weighing stage.

Miniaturization of the components is desirable. Thus, a different configuration for the spring, or for the weight sensors altogether is within the invention. The circuitry required can all be miniaturized onto a printed circuit board.

The apparatus may dispense in several modes: individual ingredients, multiple ingredients either simultaneously or sequentially, and programmed recipes of ingredients. The accuracy should be on the order of 1 teaspoon per cup. It is beneficial if the time to dispense an individual ingredient is less than fifteen seconds, with the time to dispense five ingredients being less than forty-five seconds. The cannisters should be air-tight.

It is also possible to provide a status feature, whereupon pressing a status button, the microprocessor displays the amount of ingredient remaining in each cannister, so that replenishment can be organized. As has been explained above, every time a cannister is refilled, it is filled to an volume or weight that is loaded into the microprocessor at initialization. As ingredient is dispensed, the microprocessor calculates how much ingredient is remaining, and stores that remaining amount in memory and in the EPROM. Thus, the remaining volume or weight is always available.

Flour is difficult to dispense under certain circumstances because it adheres to itself, and can thus block up internal passageways in the cannisters, around the slats. Cannisters for containing ingredient that is difficult to dispense, such as flour, may be provided with a plurality of elongated slender members that extend into the container, such as vertical wires 350, as shown in FIG. 3 through the cannister to keep the ingredient from packing too tightly.

Other types of dispensing mechanisms and actuators can be provided. For instance, for more cohesive ingredient, such as brown sugar, a positive displacement urging device, such as a piston, can be used to push ingredient out of a cannister, accompanied by a cut-off tool to terminate dispensing.

For certain types of ingredient, it is believed to be possible to establish a uniform flow rate, such that it would not be necessary to measure the weight of the dispensed ingredient, and therefore, it would not be necessary to have a weighing stage at all. According to this embodiment, rather than storing ingredient densities, the EPROM would store ingredient volume (or weight) flow rates under certain voice coil frequency and amplitude conditions. For instance, it may be that at a certain frequency and amplitude voice coil oscillation flour dispenses at one-half cup per second. It is believed that at relatively high frequencies, many dry ingredients dispense with almost the regularity of liquid flow.

Thus, rather than monitoring the weight of ingredient accumulating on the weighing stage, the microprocessor would monitor the duration of the oscillation, cutting off oscillation when it calculates that the desired amount had flowed out of the cannister. Microprocessor program steps for implementation of such an embodiment are shown schematically in FIG. 10C. Most of the steps that precede the "check bowl" step 1069 are identical to that shown in FIG. 10B and thus, these steps are not shown. One difference is that in the initialization steps 1004, rather than setting density constants, the microprocessor sets the volume flow rate constants.

At the calculation stage, the microprocessor calculates the desired time 1068 #or dispensing ingredient. The existing levels are checked just as described above, to ensure that enough ingredient is in place to satisfy the amount called for. The appropriate solenoid is energized to open the appropriate shutter, and the appropriate voice coil is oscillated to move the ingredient along the slats and out of the cannister. The time is monitored 1070, and is compared 1072 to the desired amount limit time. While the monitored time is less than the limit time, the voice coil is repeatedly oscillated. When the monitored time equals or exceeds the limit time, the voice coil is no longer oscillated and the solenoid that controls the shutter is closed. (The steps that the microprocessor follows after closing the solenoid, and checking the flour and sugar levels are identical to those described above in connection with the weighing embodiment.)

An advantage to this flow rate based embodiment is that it would be less expensive to manufacture, not requiring a weighing stage. It would also be smaller, for the same reason. A possible disadvantage is that there would be no positive control on whether the appropriate amount of ingredient had actually dispensed. Blockage, or an unexpectedly large amount of ingredient dispensed could not be monitored without some other apparatus. Another possible disadvantage is that it may be difficult to dispense both large and small amounts of the same ingredient at different times. For instance, it may be desirable at some times to dispense eight cups of flour, and at other times, to dispense just one tablespoon of flour. In such cases, it may be desirable to provide a spout having a variable width, similar to the mechanisms available to accommodate variable width paper in photocopy machines and laser printers. The two edges of the spout are connected together through a pinion and mated racks, such that moving one of the edges of the spout automatically results in the other edge of the spout moving toward the first edge an equal amount. Thus, the spout can be widened to accommodate a first flow rate for large amounts and narrowed to accommodate a second lesser flow rate for small amounts.

The foregoing apparatus has been described in terms of a microprocessor that is programmed to conduct the steps illustrated in FIGS. 10A, 10B and/or 10C. However, as is conventionally understood in the art, it is also possible to provide more elemental components, which are hardwired together in such a way that the steps required are automatically carried out. Or, alternatively, a general purpose computer can be programmed to accomplish the same steps, and a suitable interface can be provided between the computer and the actuators and weighing sensors of the apparatus. Such a configuration may be more convenient in the future as computers become standard appliances in residences.

The apparatus has also been described with a separate voice coil associated with each different ingredient cannister. It is also possible to have a single voice coil that is coupled to two or more different cannisters through a mechanical linkage that is engaged and disengaged under control of the microprocessor. In such a case, the microprocessor can also change the frequency and/or the amplitude of the vibration of the voice coil, depending on the type of ingredient to be dispensed.

The foregoing discussion should be understood as illustrative and should not be considered to be limiting in any sense. While this invention has been particularly shown and described with references to preferred embodiments thereof, it will be understood by those skilled in the art that various changes in form and details may be made therein without departing from the spirit and scope of the invention as defined by the claims.

Having described the invention, what is claimed is:

1. An apparatus for dispensing dry ingredient, said apparatus comprising:
   a. a plurality of containers, each container for containing a different ingredient, each of said containers comprising;
      i. a body having an internal chamber;
      ii. a port for dispensing said ingredient, said port arranged gravitationally below said chamber when in use;
      iii. at least two non-parallel baffles adjacent said port, said baffles being arranged generally one above another and inclined relative to a gravitational field when in use said baffles further defining a passageway between the edge of a relatively upper baffle and the surface of an adjacent relatively lower baffle through which said ingredient may pass, said passageway sized and said baffles inclined such that a portion of said ingredient rests upon at least the bottom-most of said baffles against the force of gravity;

b. a collection stage that is arranged relative to each of said plurality of container ports so that ingredient dispensed from each port is deposited upon said collection stage; and c. a vibrator for exciting at least one of said baffles of each container such that said ingredient is urged to pass through said respective passageway and out of said chamber.

2. The dispensing apparatus of claim 1, further comprising a controller for activating the vibrator associated with the container containing a preselected type of ingredient and for deactivating said associated vibrator if a preselected amount of preselected type of ingredient has been deposited upon said collection stage.

3. The dispensing apparatus of claim 2, further comprising an ingredient selector comprising an input control by which a user can establish the type of said preselected type of ingredient for use by said controller.

4. The dispensing apparatus of claim 3, further comprising an amount selector comprising an input control by which a user can select an amount of said preselected type of ingredient for use by said controller.

5. The dispensing apparatus of claim 4, said amount selector further comprising an input control by which a user can specify said selected amount in units of weight and in units of volume.

6. The dispensing apparatus of claim 4, further comprising a weighing apparatus coupled to said collection stage, such that said weighing apparatus may generate a signal that corresponds to the weight of ingredient deposited upon said collection stage.

7. The dispensing apparatus of claim 6, said input control comprising a selector by which the user can select an amount of said preselected type of ingredient measured by weight, further comprising a calculator for generating a weight limit signal corresponding to the weight of the selected amount of the selected ingredient.

8. The dispensing apparatus of claim 7, further comprising a comparator for comparing said weight limit signal to said signal generated by said weighing stage and for generating a "selected weight collected" signal to said controller if said signal comparison indicates that the amount of said ingredient dispensed weighs at least equal to said preselected weight.

9. The dispensing apparatus of claim 6, said input control comprising a selector by which the user can select an amount of said preselected type of ingredient measured by volume, further comprising memory in which are stored signals representing the densities of said different types of ingredients, and means for providing said density signals to a calculator for generating a weight limit signal corresponding to the weight of the selected volume of the selected ingredient.

10. The dispensing apparatus of claim 6, said controller comprising a computer processor, said processor programmed to generate a weight limit signal corresponding to the weight of the selected amount of the selected ingredient.

11. The dispensing apparatus of claim 10, further comprising memory in which are stored signals representing the densities of said different types of ingredients, and means for providing said density signals to said processor.

12. The dispensing apparatus of claim 10, said processor further programmed to convert any specification of said selected ingredient amount specified in units of volume into a corresponding specification in units of weight.

13. The dispensing apparatus of claim 10, each of said containers further comprising a shutter to selectively open and close said respective port.

14. The dispensing apparatus of claim 13, further comprising an opener to open said shutter when said vibrator is exciting said baffle.

15. The dispensing apparatus of claim 14, said processor further being programmed to open said shutter before activating said associated vibrator.

16. The dispensing apparatus of claim 10, said processor comprising a microprocessor.

17. The dispensing apparatus of claim 4, further comprising a calculator for calculating the amount of ingredient that has been deposited upon said collection stage based on the time interval between when said associated vibrator is activated and when it is deactivated.

18. The dispensing apparatus of claim 17, further comprising memory in which are stored signals representing the volume flow rates of said different types of ingredients, and means for providing said volume flow rate signals to said calculator.

19. The dispensing apparatus of claim 4 said controller comprising a computer processor, said processor programmed to calculate the amount of ingredient that has been deposited upon said collection stage based on the time interval between when said associated vibrator is activated and when it is deactivated.

20. The dispensing apparatus of claim 19, further comprising memory in which are stored signals representing the volume flow rates of said different types of ingredients, and means for providing said volume flow rate signals to said processor.

21. The dispensing apparatus of claim 4, said amount selector further comprising an input control by which a user can select a small amount of ingredient to be dispensed repeatedly as long as said input control is energized.

22. The dispensing apparatus of claim 3, said ingredient selector further comprising a means for displaying a list of recipe combinations of amounts of different ingredients from different of said at least one containers and an input control for selecting one of said recipe combinations.

23. The dispensing apparatus of claim 22, further comprising a memory for storing said recipe combinations of amounts of different ingredients.

24. The dispensing apparatus of claim 1, said passageway sized and said at least the bottom-most baffle inclined such that said ingredient rests substantially motionless, in the absence of any vibrational excitement of said baffles.

25. The dispensing apparatus of claim 1, further comprising a body portion for releasably receiving said containers.

26. The dispensing apparatus of claim 1, said at least two baffles inclined relative to said gravitational field at an angle of between 95° and 135°.

27. The dispensing apparatus of claim 1, further comprising a sensor for sensing whether or not a collecting bowl is present on said weighing apparatus.

28. The dispensing apparatus of claim 1, said plurality of containers comprising between two and eight containers.

29. The dispensing apparatus of claim 1, at least one of said containers further comprising a plurality of elongated slender members that extend into said internal chamber.

30. An apparatus for dispensing dry ingredient, said apparatus comprising:

a. a plurality of containers, each container for containing a different ingredient, each of said containers comprising;
  i. a body having an internal chamber;
  ii. a port for dispensing said ingredient, said port arranged gravitationally below said chamber when in use;
  iii. at least two non-parallel baffles adjacent said port, said baffles being arranged generally one above another and inclined relative to a gravitational field when in use, said baffles further defining a passageway between the edge of a relatively upper baffle and the surface of an adjacent relatively lower baffle through which said ingredient may pass, said passageway sized and said baffles inclined such that said ingredient rests upon said baffles against the force of gravity substantially motionless, in the absence of any vibrational excitement of said baffles;

b. a collection stage that is arranged relative to each of said plurality of container ports so that ingredient dispensed from each port is deposited upon said collection stage; and c. a vibrator for exciting at least one of said baffles of each container such that said ingredient is urged to pass through said respective passageway and out of said chamber;

d. a user input device that generates signals corresponding to a user's selection of type of ingredient and an amount of said selected ingredient;

e. a computer processor for selecting which container to be excited by said vibrator, based on said signal corresponding to said user's selection of ingredient type and for controlling the duration of excitement by said vibrator based on said signal corresponding to said user's selection of ingredient amount; and f. a weighing apparatus coupled to said collection stage, comprising means for generating a signal to said processor that corresponds to the weight of ingredient deposited upon said collection stage.

* * * * *